(12) United States Patent
Wilmot

(10) Patent No.: US 9,944,252 B2
(45) Date of Patent: Apr. 17, 2018

(54) PRESSURIZED GAS-POWERED ACTUATOR AND SEALED PISTON ROD THEREFOR

(71) Applicant: TK Holdings Inc., Auburn Hills, MI (US)

(72) Inventor: Larry M. Wilmot, Oxford, MI (US)

(73) Assignee: TK Holdings Inc., Auburn Hills, MI (US)

( * ) Notice: Subject to any disclaimer, the term of this patent is extended or adjusted under 35 U.S.C. 154(b) by 467 days.

(21) Appl. No.: 14/618,933

(22) Filed: Feb. 10, 2015

(65) Prior Publication Data

US 2015/0226239 A1  Aug. 13, 2015

Related U.S. Application Data

(60) Provisional application No. 61/938,121, filed on Feb. 10, 2014, provisional application No. 61/939,696, filed on Feb. 13, 2014.

(51) Int. Cl.

| B60R 21/38 | (2011.01) |
|---|---|
| F15B 15/14 | (2006.01) |
| F15B 15/19 | (2006.01) |
| F15B 20/00 | (2006.01) |

(52) U.S. Cl.
CPC ............ B60R 21/38 (2013.01); F15B 15/149 (2013.01); F15B 15/1452 (2013.01); F15B 15/19 (2013.01); F15B 20/007 (2013.01); *F15B 15/1428* (2013.01); *F15B 15/1442* (2013.01); *F15B 15/1457* (2013.01)

(58) Field of Classification Search
CPC .. B60R 21/38; F15B 15/1428; F15B 15/1438; F15B 15/1442; F15B 15/1452; F15B 15/1457; F15B 15/1461; F15B 15/149; F15B 15/19; F15B 20/007; F15B 2215/30
See application file for complete search history.

(56) References Cited

U.S. PATENT DOCUMENTS

| 2,918,908 A | 8/1955 | Herner |
| 2014/0338525 A1 | 11/2014 | Henck |

FOREIGN PATENT DOCUMENTS

| CH | 399084 A | * | 3/1966 | .......... F15B 15/1442 |
| DE | 2742840 A1 | * | 4/1979 | ............ B60Q 1/064 |
| GB | 2395692 | | 2/2004 | |
| JP | 200875739 | | 4/2008 | |
| WO | 2008026423 | | 6/2008 | |

* cited by examiner

*Primary Examiner* — Logan Kraft
(74) *Attorney, Agent, or Firm* — Meunier Carlin & Curfman LLC

(57) ABSTRACT

A piston rod assembly for a pressurized fluid-powered actuator is provided. The assembly includes a piston rod having a fluid flow passage extending along an interior thereof, and a cap secured to the piston rod at a position along the fluid flow passage. Sealing means is positioned between the piston rod and the cap so as to provide a fluid-tight seal between the piston rod and the cap.

6 Claims, 18 Drawing Sheets

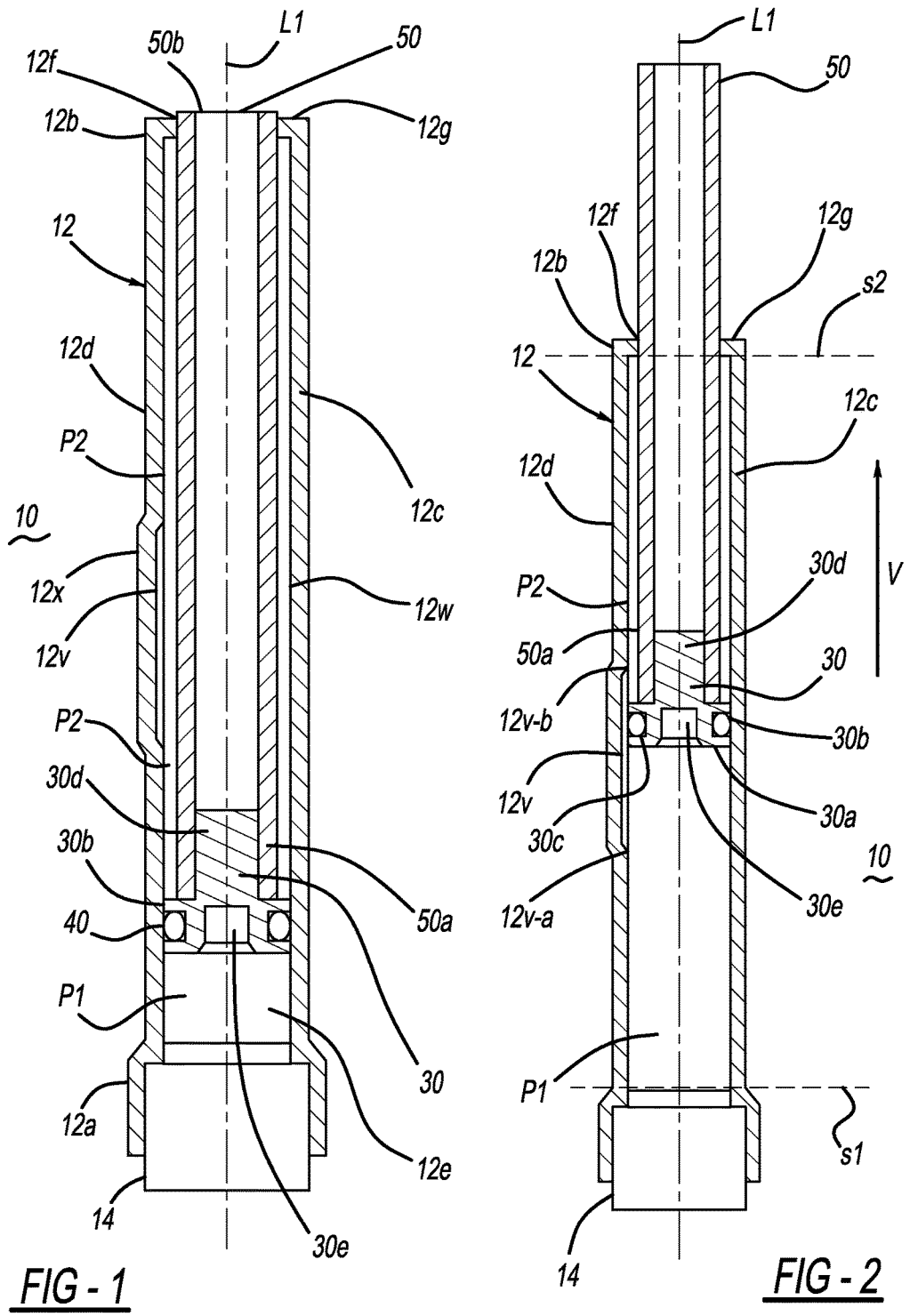

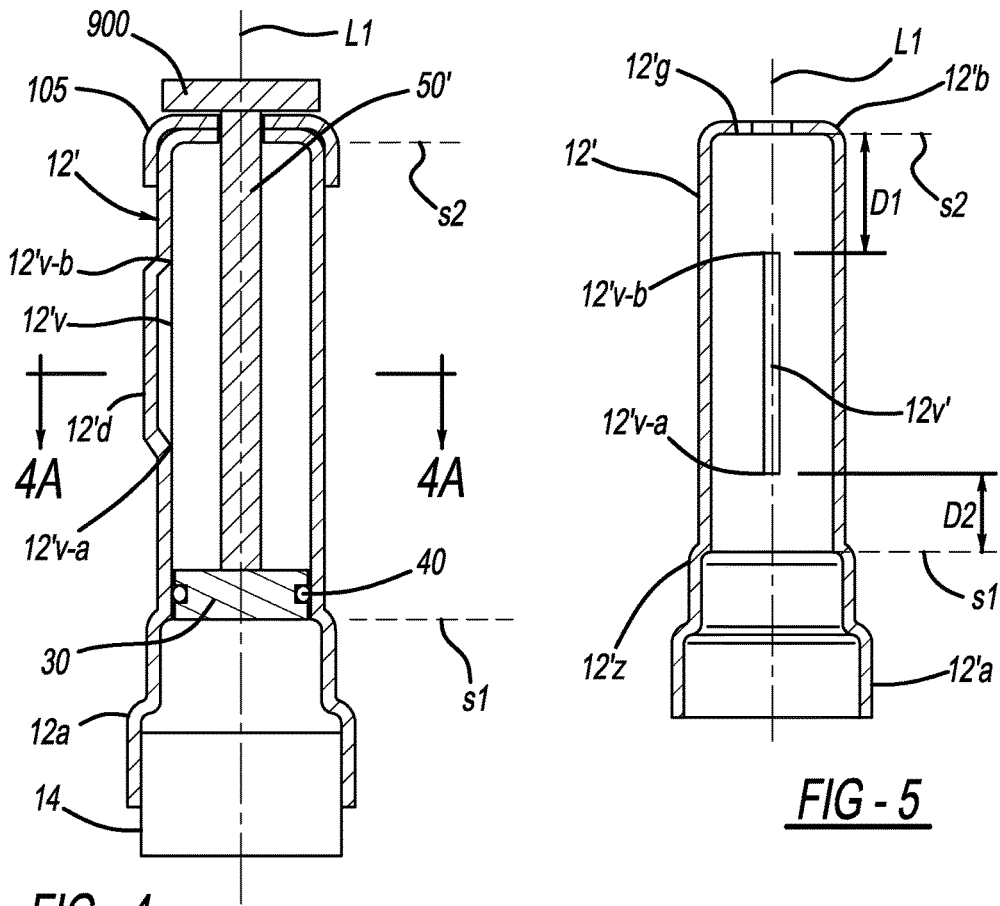
FIG - 4
FIG - 5
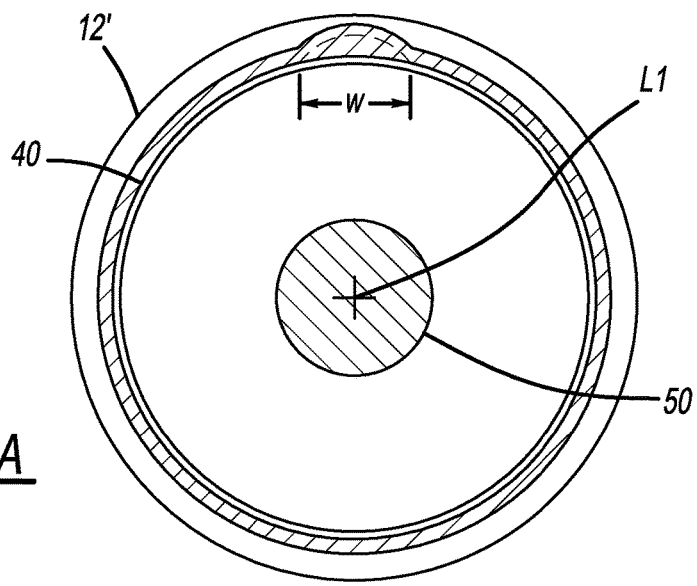
FIG - 4A

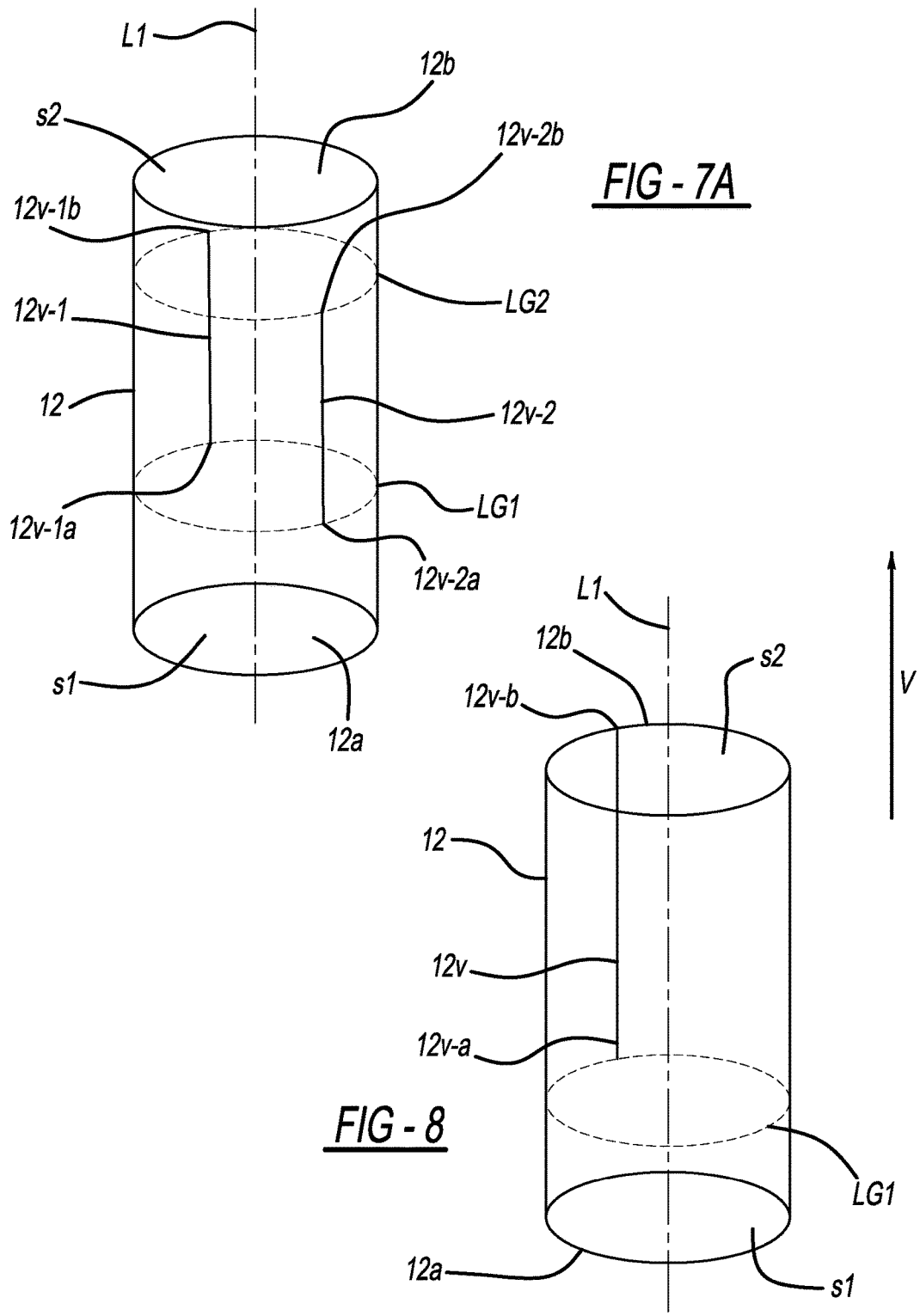

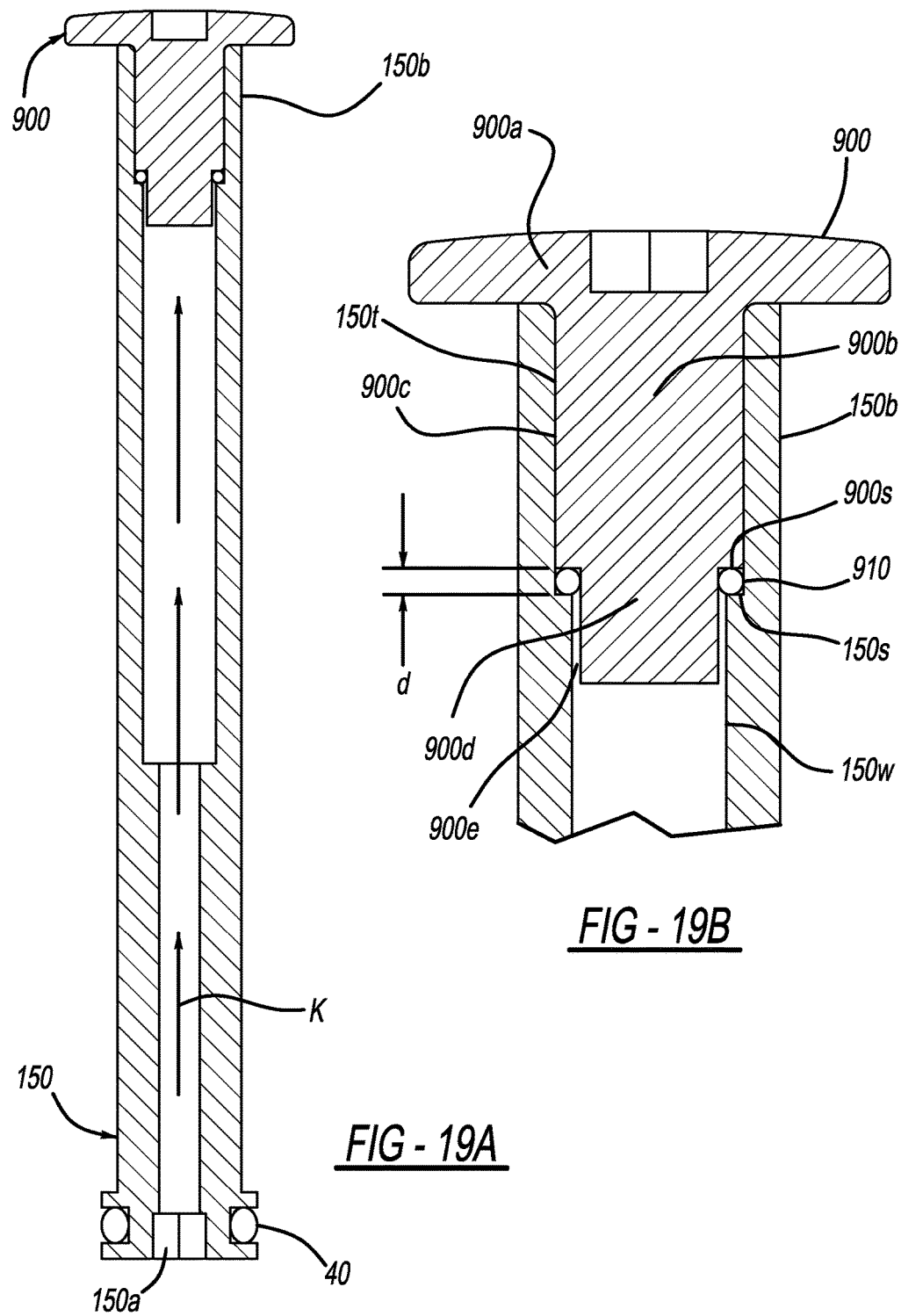

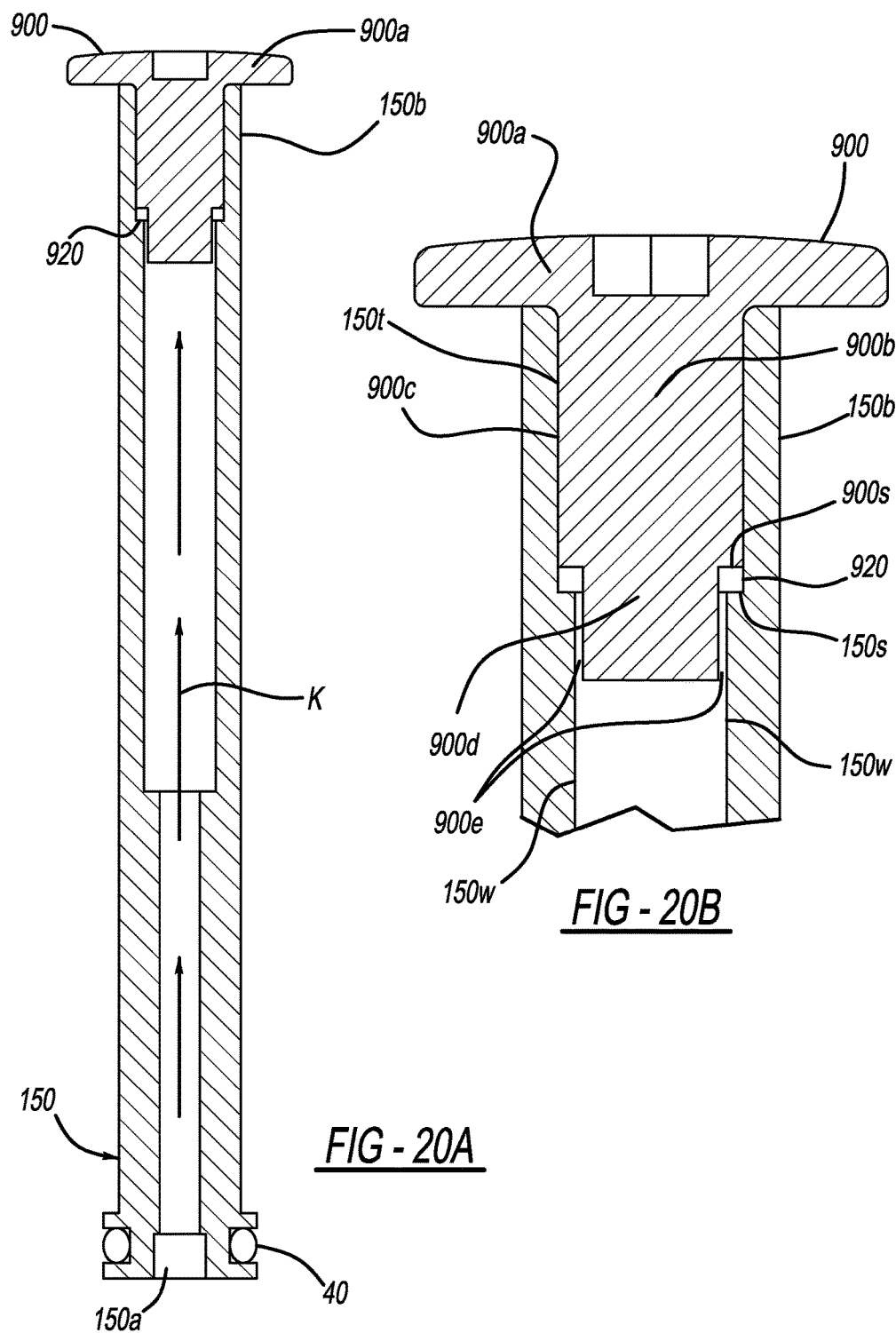

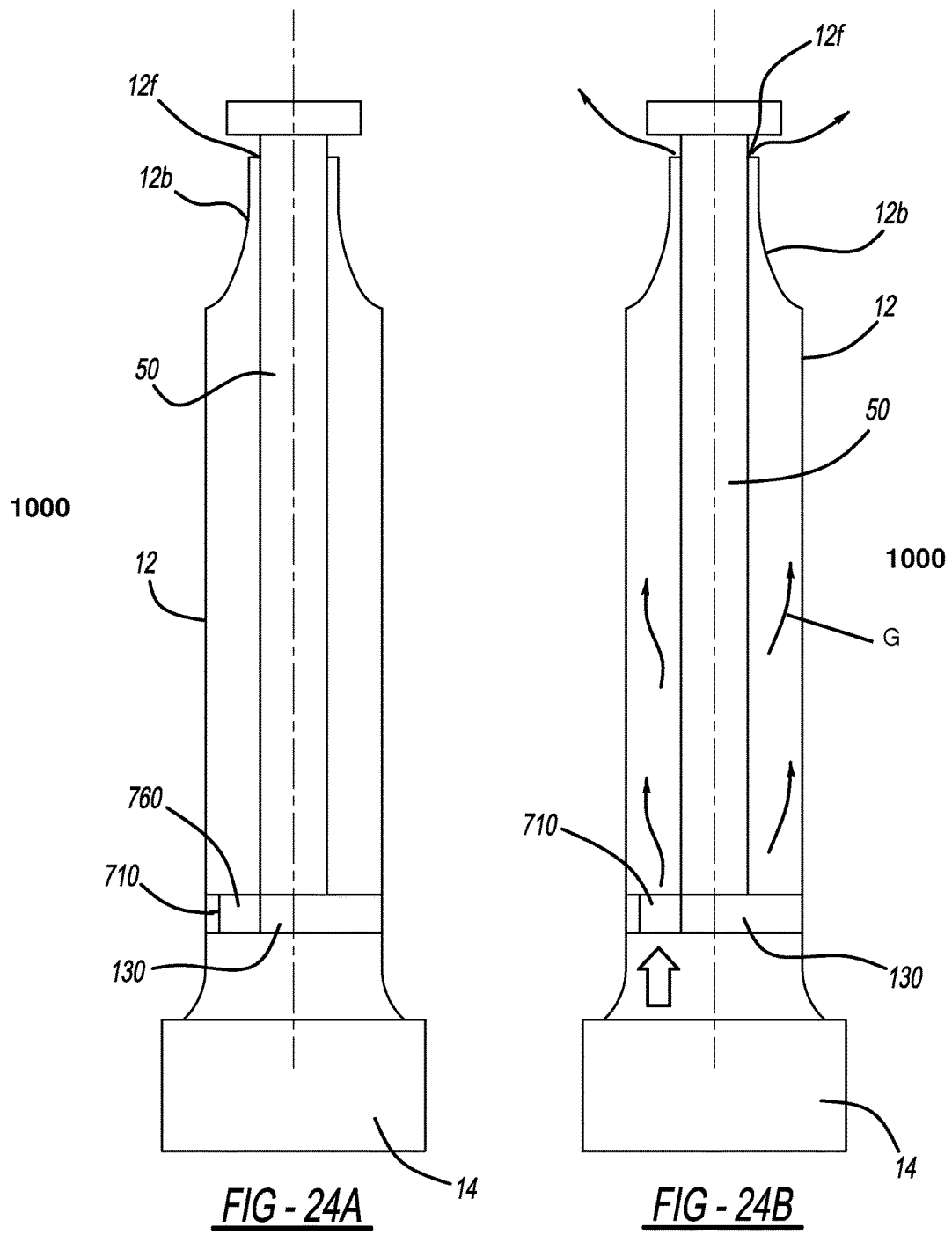

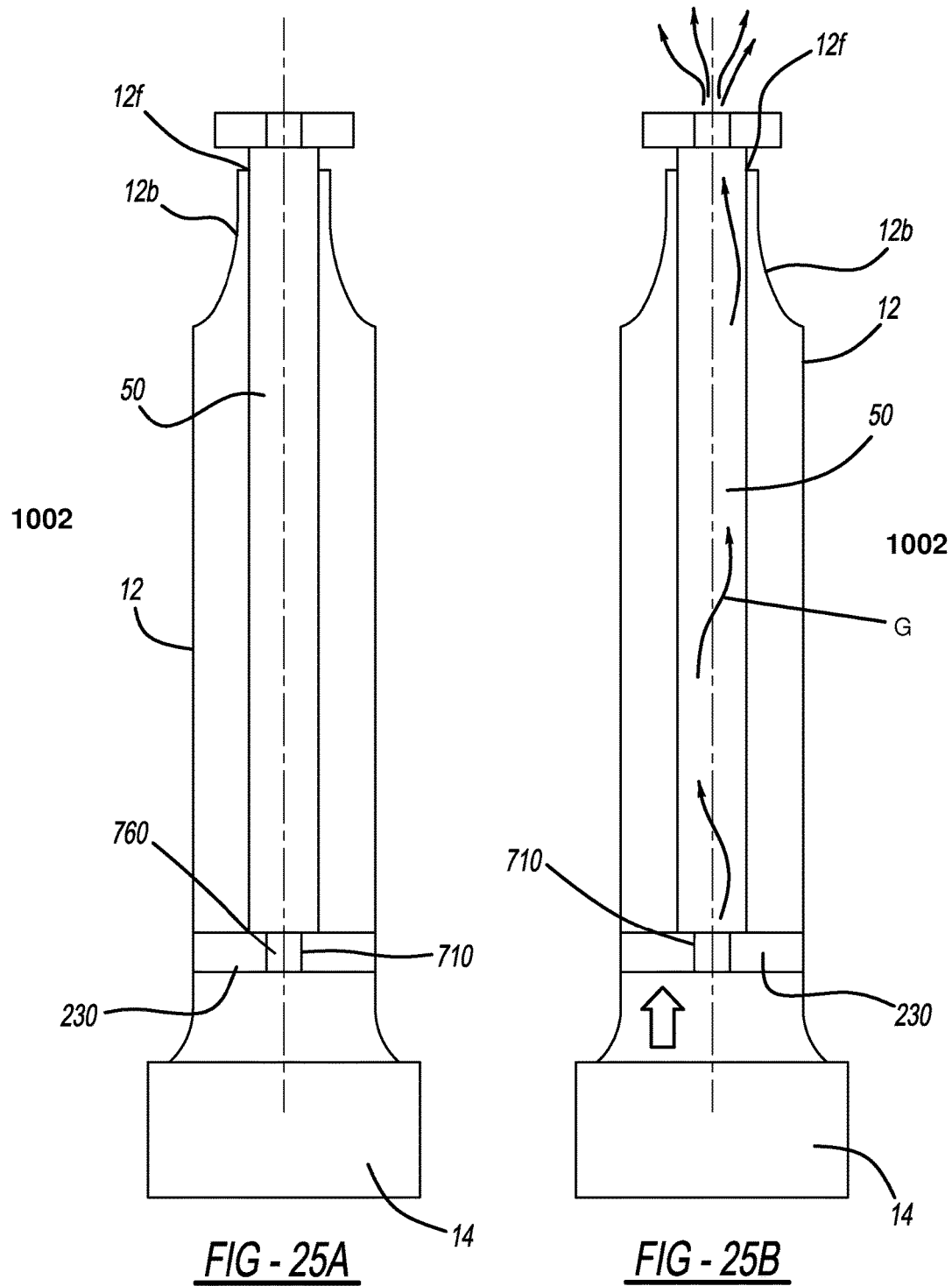
*FIG - 25A*  *FIG - 25B*

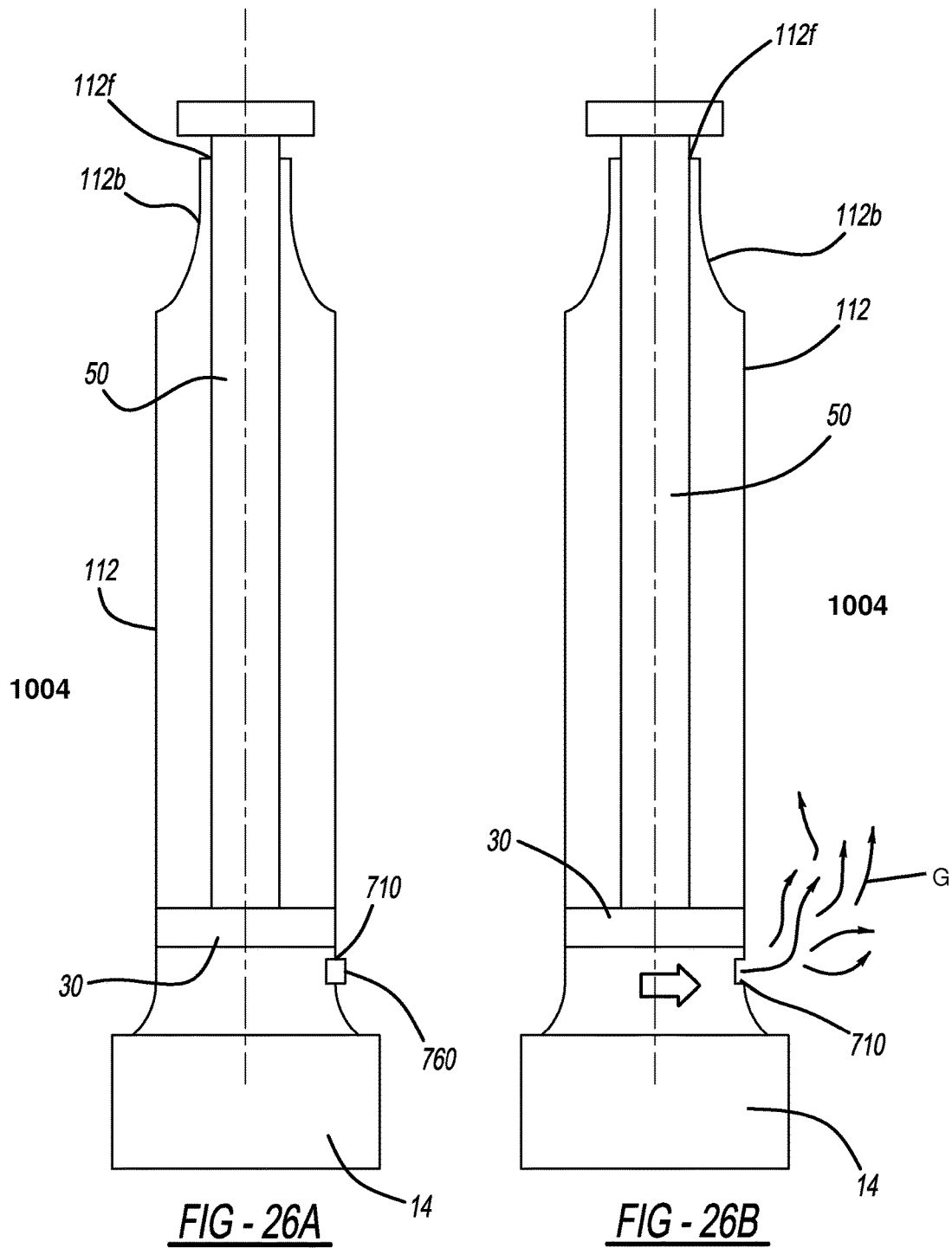
*FIG - 26A*  *FIG - 26B*

PRESSURIZED GAS-POWERED ACTUATOR AND SEALED PISTON ROD THEREFOR

CROSS-REFERENCE TO RELATED APPLICATIONS

This application claims the benefit of U.S. Provisional Application Ser. No. 61/938,121, filed on Feb. 10, 2014, and 61/939,696, filed on Feb. 13, 2014, the disclosures of which are incorporated herein by reference in their entireties.

BACKGROUND OF THE INVENTION

The embodiments described herein generally relate to a pressurized gas-powered actuator and, more particularly, to methods and structures usable for maintaining an elevated pressure within the actuator, so as to maintain the actuator in a deployed state for a relatively extended period of time.

In pressurized fluid-powered, piston driven actuators, fluid from a pressurized fluid source (for example, a pyrotechnic gas generator) is applied to a piston, thereby producing movement of the piston within the housing, and deployment or extension of an attached piston rod from the actuator housing. In this manner, force may be exerted by the piston rod on an actuatable element located exterior of the actuator housing.

In certain applications of such actuators, it is desirable to maintain the piston in an extended or deployed condition for an extended period of time (for example, up to 15 minutes) after deployment of the piston rod. However, depending on the structure of the piston and/or piston rod, the pressurized fluid may find leakage paths through the interior of the actuator, making it difficult to maintain the piston in a deployed position for an extended time period.

Therefore, a need exists for a structure which seals or traps at least a portion of the pressurized fluid within the actuator so as to maintain the piston rod in an extended condition for the desired extended time period.

SUMMARY OF THE INVENTION

In one aspect of the embodiments described herein, a piston rod assembly for a pressurized fluid-powered actuator is provided. The assembly includes a piston rod having a fluid flow passage extending along an interior thereof, and a cap secured to the piston rod at a position along the fluid flow passage. Sealing means is positioned between the piston rod and the cap so as to provide a fluid-tight seal between the piston rod and the cap.

In another aspect of the embodiments of the described herein, a pressurized fluid-powered actuator is provided. The actuator includes a housing having a wall defining a housing interior and at least one first opening enabling venting of pressurized fluid from the housing interior to an exterior of the housing. A meltable plug is structured and positioned so as to prevent venting of pressurized fluid through the at least first one opening prior to melting of the plug.

In another aspect of the embodiments of the described herein, a pressurized fluid-powered actuator is provided. The actuator includes a housing, a piston movably positioned within the housing, and a hollow piston rod operatively coupled to the piston so as to move with the piston. The piston has at least one first opening formed therein. The at least one first opening is structured and positioned to enable fluid communication between a first side of the piston and an interior of the piston rod. The piston rod has at least one second opening structured to enable fluid communication between the piston rod interior and an exterior of the actuator. A meltable plug is positioned within the at least one first opening so as to prevent a flow of fluid through the at least one first opening prior to melting of the plug.

BRIEF DESCRIPTION OF THE DRAWINGS

FIG. 1 is a cross-sectional side view of one embodiment of a vented pressurized gas-powered actuator prior to enabling of gas venting through a vent groove.

FIG. 2 is a cross-sectional side view of the actuator housing shown in FIG. 1 during a portion of piston travel when venting is enabled.

FIG. 4 is a cross-sectional view of a portion of an actuator including a housing incorporating the vent groove arrangement similar to that shown in FIGS. 1-3.

FIG. 4A is a cross-sectional end view of the portion of the actuator shown in FIG. 4.

FIG. 5 is a side cross-sectional view of a particular embodiment of the housing shown in FIGS. 4 and 4A.

FIG. 7A is a schematic view of the actuator housing incorporating the vent groove arrangement shown in FIG. 7.

FIG. 8 is a schematic view of another actuator housing embodiment incorporating an alternative vent groove arrangement.

FIG. 19A is a cross-sectional side view of an alternative embodiment of a sealed piston rod usable in actuator embodiments described herein.

FIG. 19B is a magnified view of a portion of the piston rod shown in FIG. 19A.

FIG. 20A is a cross-sectional side view of another alternative embodiment of a sealed piston rod usable in actuator embodiments described herein.

FIG. 20B is a magnified view of a portion of the piston rod shown in FIG. 20A.

FIG. 24A is a schematic cross-sectional side view of an actuator incorporating one embodiment of gas vent and a heat-sensitive vent plug, in a pre-activation state of the actuator.

FIG. 24B is a schematic cross-sectional side view of the actuator of FIG. 24A in a post-activation state of the actuator.

FIG. 25A is a schematic cross-sectional side view of an actuator incorporating another embodiment of gas vent and a heat-sensitive vent plug, in a pre-activation state of the actuator.

FIG. 25B is a schematic cross-sectional side view of the actuator of FIG. 25A in a post-activation state of the actuator.

FIG. 26A is a schematic cross-sectional side view of an actuator incorporating another embodiment of gas vent and a heat-sensitive vent plug, in a pre-activation state of the actuator.

FIG. 26B is a schematic cross-sectional side view of the actuator of FIG. 26A in a post-activation state of the actuator.

DETAILED DESCRIPTION

Figure 3:
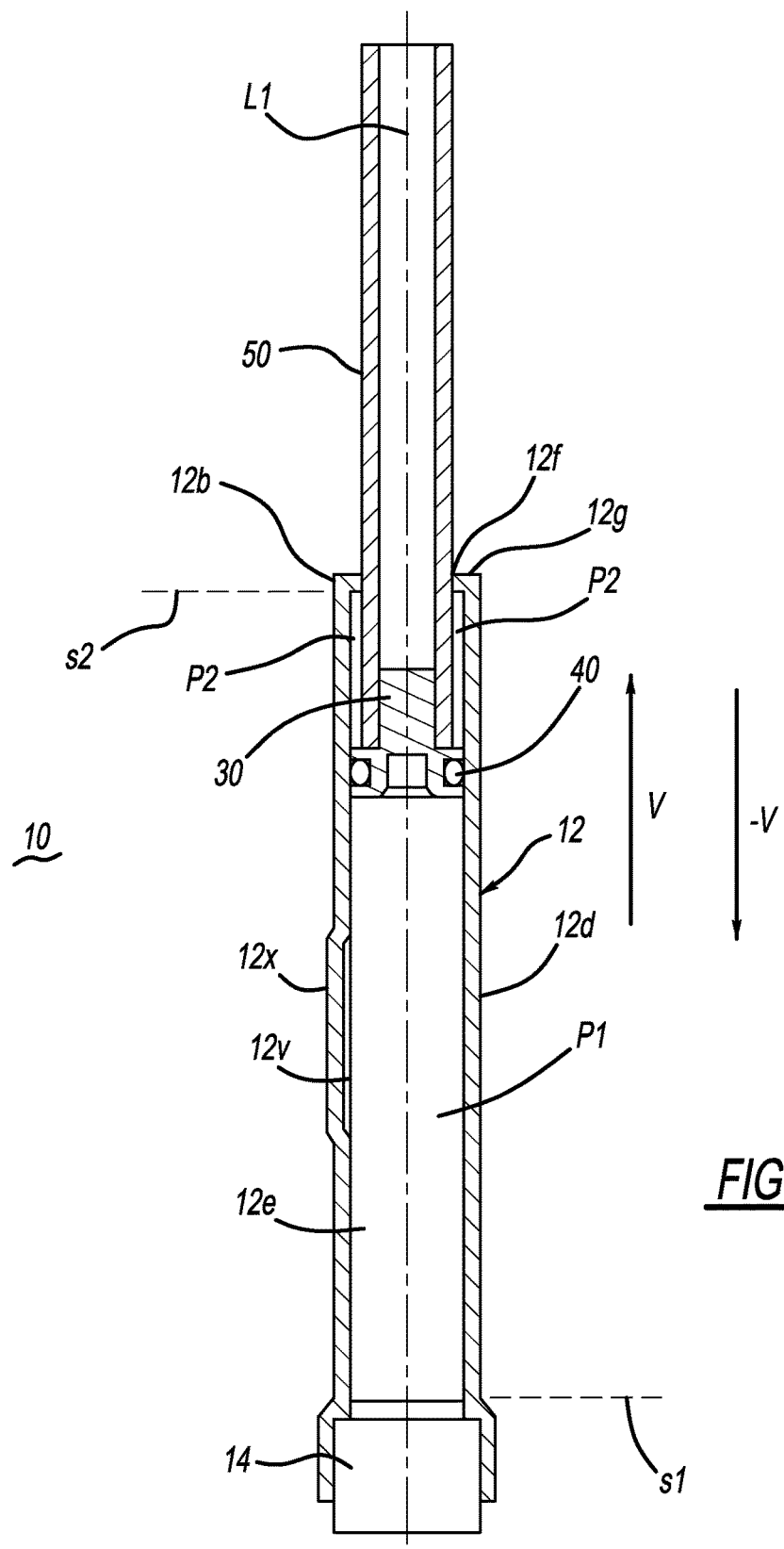
FIG. 3 is a cross-sectional side view of the actuator housing shown in FIG. 1 after the venting period, when gas venting has been disabled.
Figure 6:
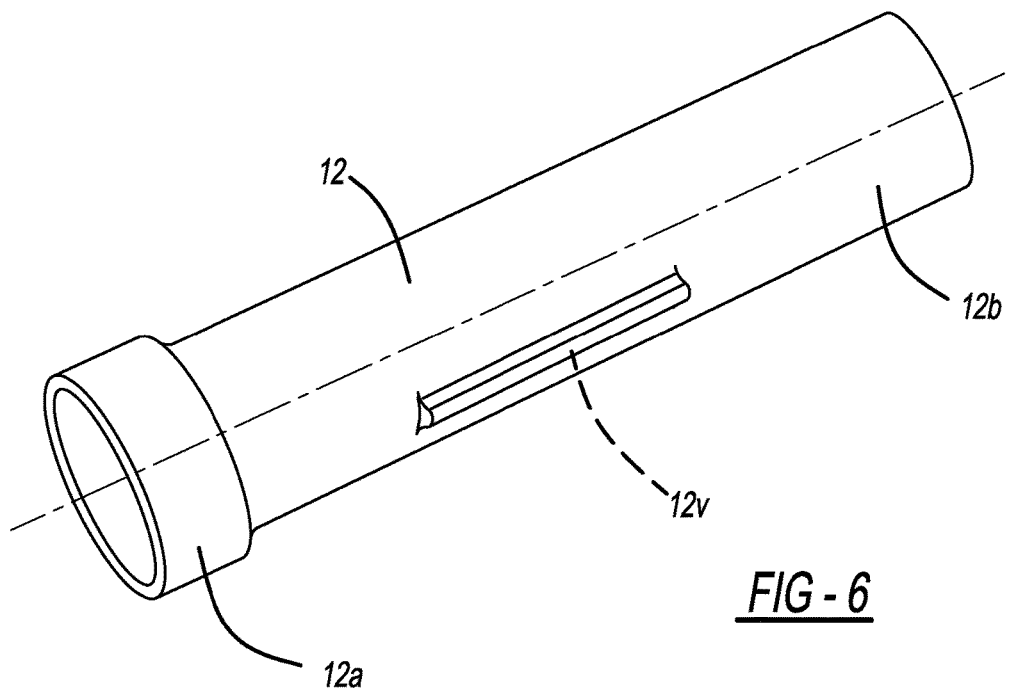
FIG. 6 is a perspective view of the housing embodiment shown in FIGS. 1-3.

Like reference numerals refer to like parts throughout the description of several views of the drawings. In addition, while target values are recited for the dimensions of the various features described herein, it is understood that these values may vary slightly due to such factors as manufacturing tolerances, and also that such variations are within the contemplated scope of the embodiments described herein.

FIGS. 1-18 show various embodiments of a vented pressurized gas-powered actuator. The actuator 10 may be mounted to any suitable device or mechanism, and may be operatively coupled (via piston rod 50, described in greater detail below) to the device or mechanism, for transmitting a force to the device or mechanism. The actuation force is generated responsive to the introduction of a pressurized gas into a housing of the actuator, in a manner described below. The pressurized gas may be generated within the housing (for example, by a gas generator incorporated into the housing), or the gas may be introduced into the housing from an external gas source in fluid communication with the housing interior. One possible application for an actuator as described herein is in lifting a portion of a hood of an automotive vehicle.

In the embodiment shown in FIG. 1, actuator 10 has a housing 12, a piston 30 slidably positioned within the housing, and a piston rod 50 attached to the piston so as to move in conjunction with the piston. Housing 12 has an outermost housing wall 12d defining a first end 12a, a second end 12b and a body 12c connecting the first and second ends. Wall 12d also defines a hollow interior 12e of the housing. In the embodiment shown in FIGS. 1-3, housing first end 12a is flared radially outwardly to accommodate a suitable gas generator 14 (for example, a known micro-gas generator) to be inserted and retained therein by crimping, adhesive attachment, or any other suitable method. A gas-emitting portion of the gas generator 14 is positioned within the housing so that generated gases flow into the housing interior 12e after activation of the gas generator. If desired, a suitable seal (such as an epoxy seal, o-ring seal or other sealing means (not shown)) may be provided to prevent or minimize leakage of generated gas between the gas generator 14 and the housing 12 to an exterior of the housing. The outermost housing wall 12d may alternatively have a uniform outermost diameter or an outermost diameter that varies in any desired way along the length of the housing, according to the requirements of a particular application.

In the embodiment shown in FIGS. 1-3, second end 12b has an opening 12f structured to receive therethrough a piston rod 50 attached to a piston 30 (described in greater detail below) which is slidably positioned in housing interior 12e. Opening 12f may be sized or otherwise structured to laterally constrain or support to the piston rod 50 as portions of the rod move into and out of the housing through opening 12f. In the particular embodiment shown in FIGS. 1-3, an end wall 12g is formed from a portion of housing 12, and opening 12f is drilled or otherwise formed in the wall 12g. If desired, any embodiment described herein may incorporate a reinforcing cap 105 (as shown, for example, in the embodiment of FIG. 4) secured to end 12b of the housing by welding or any other suitable means, to strengthen the housing end against impact forces exerted by the piston 30 contacting the end wall 12g at the end of the piston stroke.

Piston 30 is slidably positioned within housing interior 12e. In the embodiment shown in FIGS. 1-3, piston 30 has a base 30a with an outer wall 30b. A groove 30c is formed in wall 30b and is structured for receiving therein an O-ring 40 or another suitable resilient gas-tight seal. In a known manner, O-ring 40 resiliently engages or contacts the interior surfaces of housing wall 12d, thereby providing a substantially gas-tight seal between the piston 30 and wall 12d. When piston 30 is positioned in housing 12 with O-ring 40 contacting the housing wall interior surfaces, the region of contact between the O-ring and the housing wall defines a boundary between a relatively higher pressure side P1 of the piston and a relatively lower pressure side P2 of the piston. Thus, venting will occur through groove(s) 12v as described below, as long as gases traveling along the groove(s) can pass under the O-ring 40 (between the O-ring 40 and the housing wall 12d) from the higher pressure side P1 to the lower pressure side P2 side of the piston.

In the embodiment shown in FIGS. 1-3, a projection 30d extends from base 30a. Projection 30d is structured for engaging (or for suitable attachment to) an associated piston rod 50 in an interference fit, or for otherwise enabling or facilitating attachment of the piston rod 50 to the piston 30.

In a particular embodiment, a cavity 30e is formed in base 30a. Cavity 30e provides a void space in the piston which is structured to accommodate therein debris or loosened portions of gas generator 14 (for example, petalled portions of the gas generator resulting from activation of the gas generator and expulsion of the generated gases), and to confine the initial expansion of the generated gases. This can enable a relatively smaller quantity of gas generant to be used in the gas generator to produce a desired effect.

Piston rod 50 is the mechanism through which the actuator force is transmitted to an element (for example, a portion of a hood of a vehicle (not shown)) connected to the piston rod. Piston rod 50 has a first end 50*a* attached to the piston so as to move in conjunction with the piston. A second end 50*b* opposite the first end may be configured for attachment to an element or mechanism to which the actuator force is to be transmitted. In the sealed embodiments described herein, piston rod 50 is hollow and has a cap 900 attached to piston rod second end 50*b* in a manner described herein, thereby forming a piston rod assembly. The piston rod may also have any particular length, diameter, shape and/or other characteristic(s) suitable or necessary for a particular application.

Referring to FIGS. 1-3, at least one vent groove 12*v* is formed along an interior surface 12*w* of housing wall 12*d*. In the embodiment shown in FIGS. 1-3, groove 12*v* is produced by a forming operation which presses a portion 12*x* of the wall inner surface outwardly so as to stretch or deform an associated portion of the wall. The groove 12*v* is formed as the stretched or outwardly projecting portion 12*x* of the wall 12*d* is pushed outward. Groove 12*v* is structured to provide a fluid flow path between a first location in an interior of the housing 12 and a second location in the housing interior spaced apart from the first location.

Figure 18A:
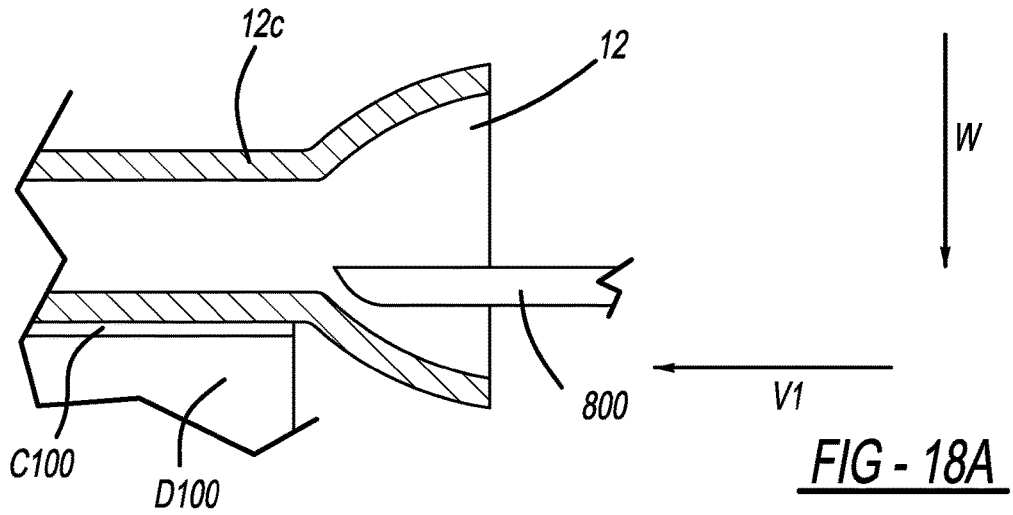
FIGS. 18A-C are cross-sectional schematic views showing one embodiment of the progression of formation of a vent groove in a wall of an actuator housing.
Figure 18B:
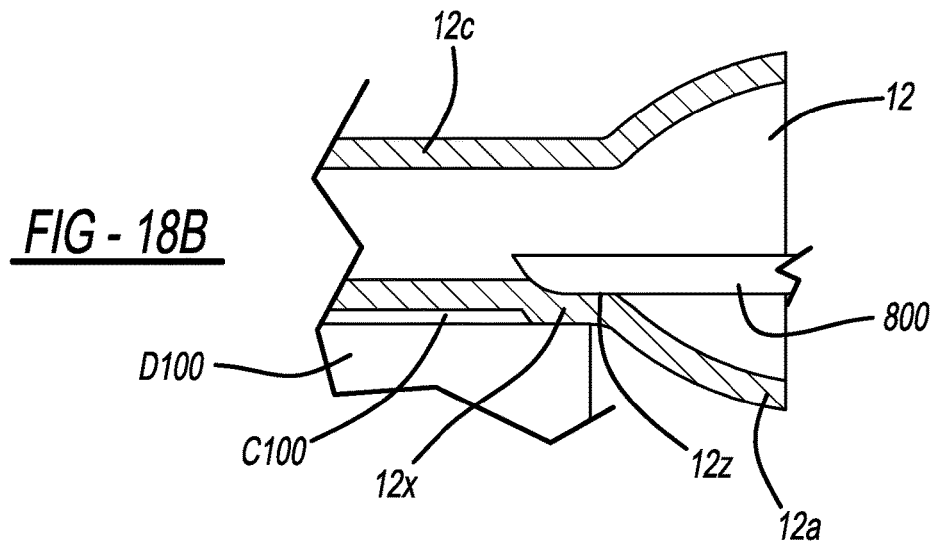
Figure 18C:
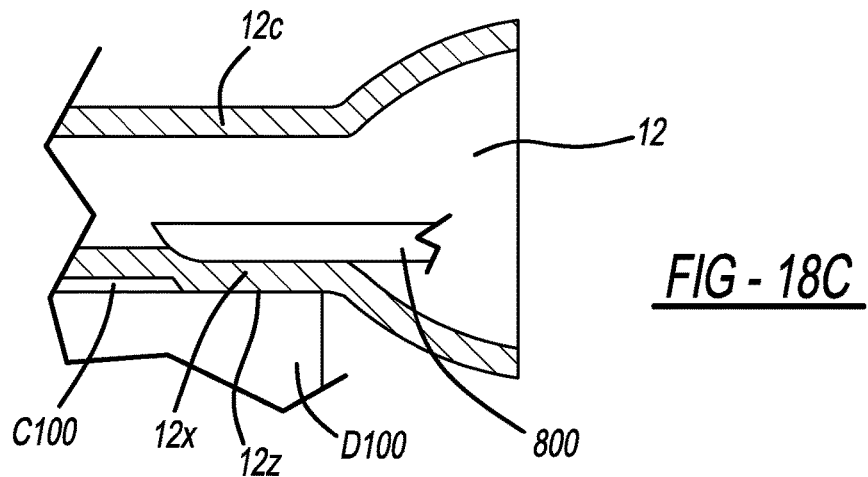

FIGS. 18A-C show the progression of formation of a vent groove 12*v* starting from an end of body portion 12*c*. In the embodiment shown, a forming tool 800 is shaped so as to produce a groove having a desired shape and dimensions, by displacing the material of the housing wall in the direction indicated by arrow W as the tool is inserted into the housing interior from an end thereof in direction V1. The portion 12*z* of the displaced housing wall material along the exterior of the housing wall flows in direction W and into a cavity C100 of an associated shaping die D100.

In the embodiments described herein, the end of at least one of the vent grooves extends to the end of body portion 12*c* such that an end of the vent groove is open at one of the housing ends 12*a* or 12*b*. Thus, the interior of the housing is able to vent to an exterior of the housing at this location.

In an alternative method (not shown), groove 12*v* is formed by a broaching operation performed on the housing wall interior surface. In a known manner, the broaching operation removes a desired amount of material from the wall interior surface, thereby reducing the thickness of the housing wall opposite the desired location of the groove.

In another alternative method of forming a groove or a portion of a groove, the housing 12 is positioned so that its length extends along and rests on a longitudinal base, with a portion of the housing exterior that will reside opposite the internal groove 12*v* being positioned over a shaping die cavity (such as cavity C100 described above). A press tool is then inserted into an end of the housing. The press tool has a groove-forming portion shaped to produce a groove or groove portion having a desired depth, shape and length when the groove forming portion is pressed into the surface of the interior of housing wall 12*d*. The groove-forming portion of the tool is pressed into the wall 12*d* in a direction perpendicular to longitudinal axis L1 of the housing 12, thereby forming the groove and deforming a portion of the housing wall outwardly into the shaping die cavity as previously described. Using this method, different portions of the groove can be formed to have different cross-sectional areas along different planes taken through housing 12 perpendicular to axis L1. This enables the cross-sectional area of the portion of the groove through which the gas flows around the O-ring to be controlled at any point along the groove (as seen for example, in FIGS. 10-13). This method also enables formation of a vent groove at a location along the housing wall spaced apart for the housing ends.

The actuator force profile (defined herein as the force exerted by the piston rod 50 on an element connected thereto as a function of time) may be controlled by controlling structural features of the actuator, such as the number of vent grooves, the areas of the vent groove(s) (defined for each vent groove as the area bounded by the O-ring and the portion of the housing wall 12*d* defining the edge of the groove at any given cross-section of the housing, shown, for example, as area A in FIG. 4A), the length(s) of the vent groove(s), the gas output characteristics of the gas generator, and other pertinent factors. The dimensions of these features can be modified to control such characteristics as the total flow rate of gases along the vents and the amount of time venting is enabled.

For example, in the embodiment shown in FIGS. 1-3, as groove 12*v* extends outside or beyond the remainder of the housing wall interior surface, the groove 12*v* provides a flow path (or vent) for pressurized gases past the O-ring 40, from the higher pressure side P1 to the lower pressure side P2, when the O-ring is positioned over the vent groove. Gases flowing along the groove 12*v* to the lower pressure side of the piston 30 are then free to flow out of the housing through housing opening 12*f*.

The venting groove extends under O-ring 40 and connects the higher pressure side P1 of the O-ring with the lower pressure side P2 of the O-ring. Thus, in the embodiments described herein, venting along a groove will be enabled as long as a gas flow passage exists along the groove and past the O-ring 40, from the higher pressure piston side P1 to the lower pressure side P2.

In the embodiments described herein, the length and position of any vent groove are specified such that the venting is enabled along only a portion of the stroke length of the piston. In such embodiments, flow of a portion of the generated gases along the vent groove and past O-ring 40 would be enabled only for a portion of the piston stroke corresponding to the length and position of the vent groove.

In particular embodiments, the positions of the ends of a groove (or grooves) may be specified so as to control the point in the piston stroke at which the onset and/or end of venting occurs. For example, the actuator housing embodiment shown in FIGS. 1-3 includes a groove 12*v* structured to enable venting to commence at a location 12*v-a* reached by the piston after travelling a specified distance within the housing. After the piston reaches groove 12*v* at 12*v-a*, venting is enabled through the groove until the O-ring passes location 12*v-b*, which is at the end of groove 12*v*.

FIGS. 4 and 4A is a cross-sectional view of a portion of an actuator including a housing incorporating the vent groove arrangement similar to that shown in FIGS. 1-3. FIG. 5 shows a particular embodiment of the housing shown in FIGS. 4 and 4A. In this embodiment, the groove 12'*v* is formed along the length of the housing such that a distance D1 of groove end 12'*v-b* from an interior surface of housing endwall 12'*g* is 30 millimeters, and a distance D2 of groove end 12'*v-a* from a surface of the piston closest to housing end 12'*a* is 30 millimeters prior to start of the piston stroke.

In another embodiment (shown in FIG. 8), groove 12v extends to housing end 12b, and venting is delayed until the piston reaches groove 12v at 12v-a, and then is enabled all the way to an opposite end 12b of the housing.

In other embodiments, multiple vent grooves may be spaced apart along the housing wall interior surface. For example, FIGS. 7, 7A, 15, 16 and 17 show schematic views of actuator housings having multiple spaced apart grooves, 12v-1 and 12v-2. Planes s1 and s2 schematically represent the ends or limits of the portion of the housing along which venting from the higher pressure piston side P1 to the lower pressure side P2 may be enabled by providing vent grooves along the housing. The piston moves in direction V, with the piston stroke beginning at or about plane s1 and ending at or about plane s2.

Figure 7:
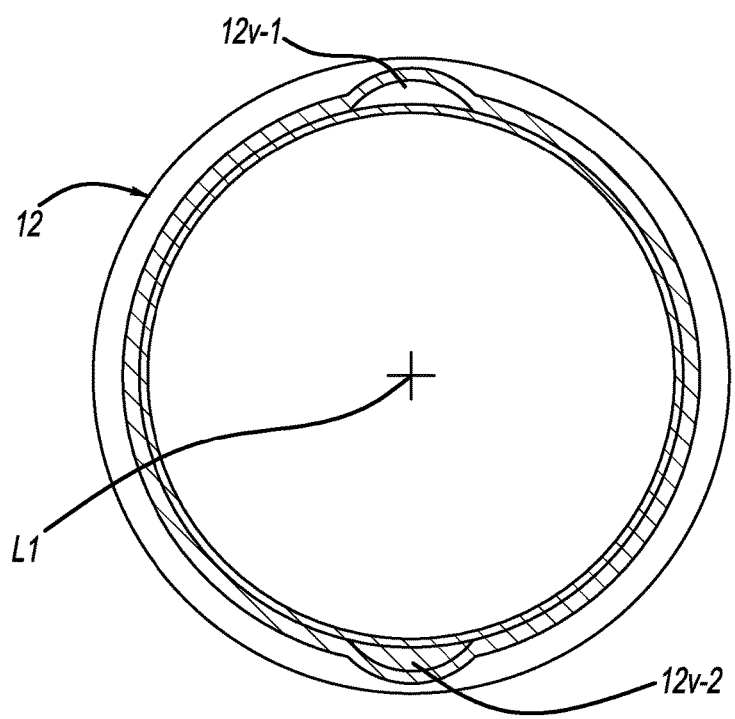
FIG. 7 is a cross-sectional end view of another embodiment of an actuator housing showing an alternative vent groove arrangement.

FIG. 7 shows a plan cross-sectional view of a portion of an actuator housing having two diametrically opposed vent grooves 12v-1 and 12v-2. FIG. 7A shows a schematic view of a housing incorporating the vent groove arrangement shown in FIG. 7. In the particular embodiment shown in FIGS. 7 and 7A, grooves 12v-1 and 12v-2 have equal lengths and are coextensive along the housing (i.e., the beginnings of the grooves are located along a common plane LG1 extending perpendicular to the housing longitudinal axis L1, and the ends of the grooves are located along another common plane LG2 extending perpendicular to the housing longitudinal axis L1 and located spaced apart from the first plane). Thus, in this embodiment, venting through both grooves commences at the same time and ends at the same time as the piston travels in direction V. The ends of the grooves 12v-1 and 12v-2 are also spaced apart from both ends of the housing 12. However, opposite grooves as shown in FIG. 7A may alternatively have different lengths.

In any embodiment incorporating multiple grooves, each groove may have any desired length and relative position along the length of housing 12. That is, the grooves may or may not have the same lengths, and may or may not be coextensive with each other, according to the actuation force requirements of a particular application. Also, any desired number of vent grooves may be employed. In addition, although the grooves 12v-1 and 12v-2 shown in FIGS. 7 and 7A are angularly spaced apart 180°, the angular spacing(s) and/or other distances between any pair of grooves in any set of grooves may be equal or unequal.

Although FIGS. 7 and 7A show a pair of vent grooves, an embodiment of the housing may incorporate any desired number of spaced apart vent grooves formed in at least one interior surface of the wall, with each vent groove being structured to provide an associated fluid flow path between an associated first location in the housing interior and an associated second location in the housing interior spaced apart from the associated first location.

Another embodiment (shown in FIG. 15) includes two vents 12v-1 and 12v-2 similar to the vent 12v shown in FIG. 8. In this embodiment, venting is delayed in both grooves 12v-1 and 12v-2 until the piston reaches groove 12v-1 at 12v-1a (residing along plane LG1) and groove 12v-2 at 12v-2a (also residing along plane LG1). Venting along both grooves is then enabled all the way to an opposite end 12b of the housing.

Another embodiment (shown in FIG. 16) includes at least two grooves 12v-1 and 12v-2 with overlapping ends. Groove 12v-1 is structured to enable venting to commence at a point 12v-1a (located along a first plane LG1) reached by the piston after travelling a specified distance within the housing. After the piston reaches groove 12v-1 at 12v-1a, venting is enabled through the groove until the O-ring passes 12v-1b (located along plane LG3), which is the end of groove 12v-1. However, during passage of the O-ring from point 12v-1a to 12v-1b along groove 12v-1, the O-ring passes over point 12v-2a along groove 12v-2 (located at the lower end of groove 12v-2, along plane LG2), thereby enabling venting along groove 12v-2 as well as along groove 12v-1. Venting is now enabled along both grooves until the O-ring passes point 12v-1b (located along plane LG3) along groove 12v-1, after which venting is enabled only along groove 12v-2 until the end 12v-2b of this groove.

Figure 16:
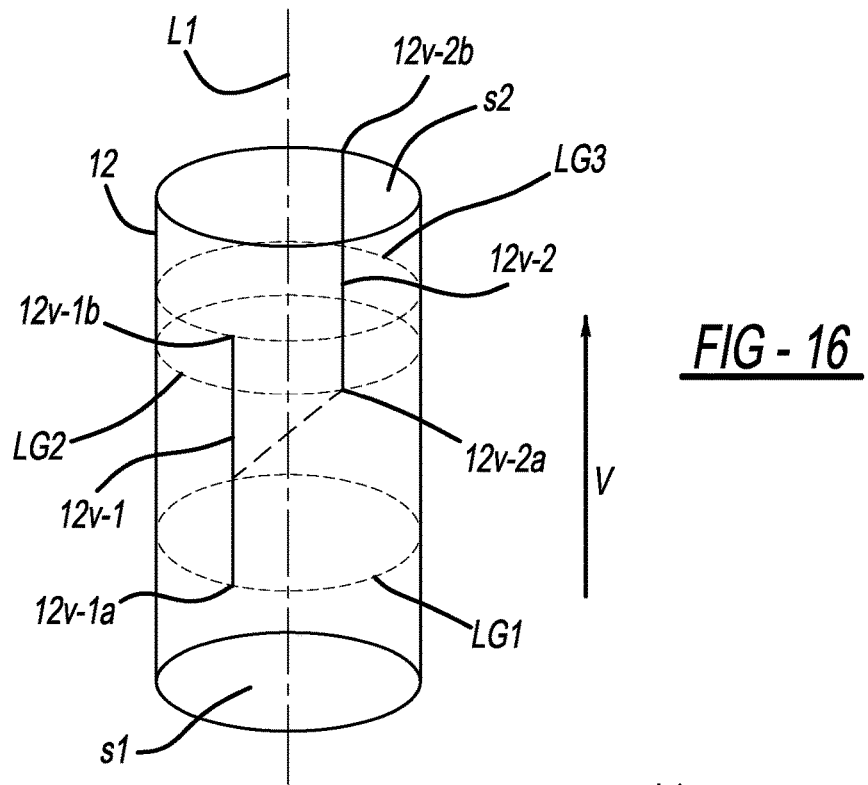
FIG. 16 is a schematic view of another actuator housing embodiment incorporating an alternative vent groove arrangement.

Although FIG. 16 shows an the embodiment having one pair of overlapping grooves, any number of overlapping grooves may be employed as needed to achieve a desired actuation force profile. For example, a single first groove enabling venting during a first portion of the piston stroke may overlap with multiple second grooves, in the manner shown in FIG. 16, to enable venting through these second grooves in a later portion of the piston stroke. Similarly, multiple first grooves enabling venting during a first portion of the piston stroke may overlap with a single second groove, in the manner shown in FIG. 16, to enable venting through this second groove in a later portion of the piston stroke.

Figure 17:
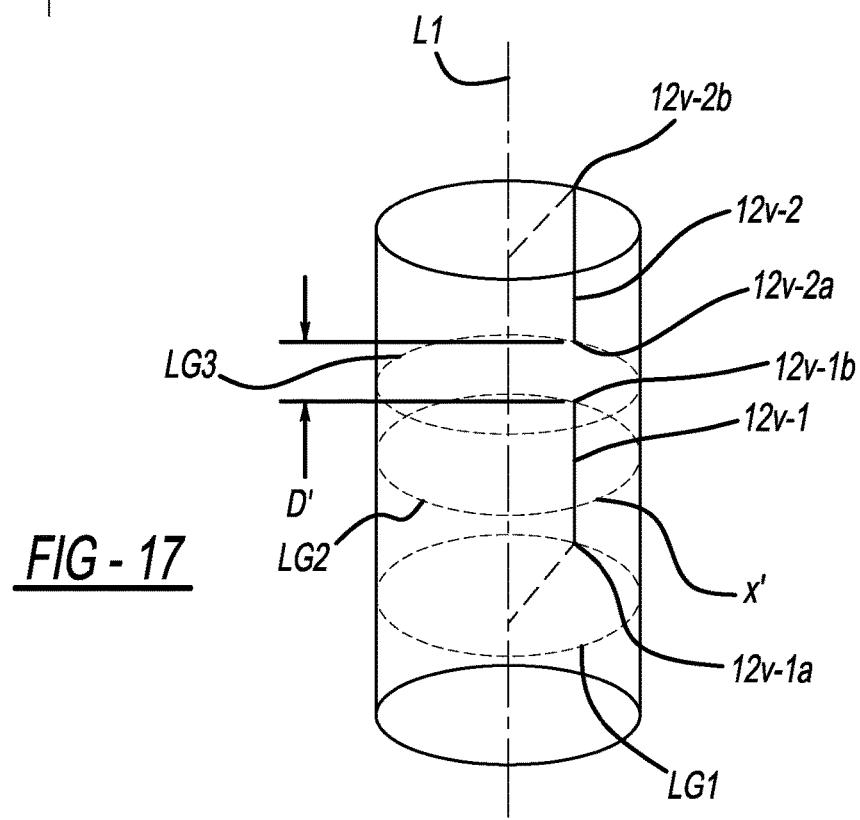
FIG. 17 is a schematic view of another actuator housing embodiment incorporating an alternative vent groove arrangement.

Another embodiment (shown in FIG. 17) includes at least two grooves 12v-1 and 12v-2 arranged along a common plane X', with a space D' between adjacent ends of the grooves. Longitudinal axes of both grooves lie along the plane X' which extends from the housing longitudinal axis L1 to a side of the housing, as shown in FIG. 17. Groove 12v-1 is structured to enable venting to commence at a point 12v-1a (located along plane LG1) reached by the piston after travelling a specified distance within the housing. After the piston reaches groove 12v-1 at 12v-1a, venting is enabled through the groove until the O-ring passes 12v-1b (located along plane LG2), which is the end of groove 12v-1. Venting is then disabled until the O-ring reaches end 12v-2a of groove 12v-2 (located along plane LG3). Venting is then enabled along groove 12v-2 until end 12v-2b of groove 12v-2 is reached.

In the embodiment shown in FIGS. 1-3, groove 12v has a constant cross-sectional area (within the limits of manufacturing tolerances) along its entire length. In any of the embodiments described herein, the grooves (where multiple grooves are incorporated into the housing) may have the same cross-sectional areas or different cross-sectional areas.

In addition, the cross-sectional area of any particular groove may be varied along its length as another means of affecting the actuator force profile. Control of the area through which the gases may flow enables a controlled variation of the gas flow or venting rate as the piston travels along the groove.

Figure 9A:
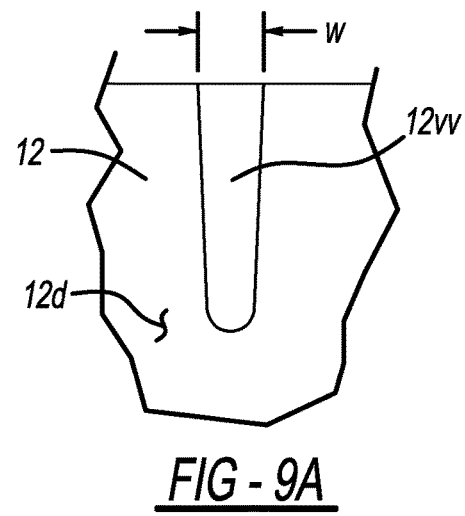
FIG. 9A is a cross-sectional view of a portion of a housing incorporating another embodiment of a vent groove having a varying cross-sectional area.
Figure 9:
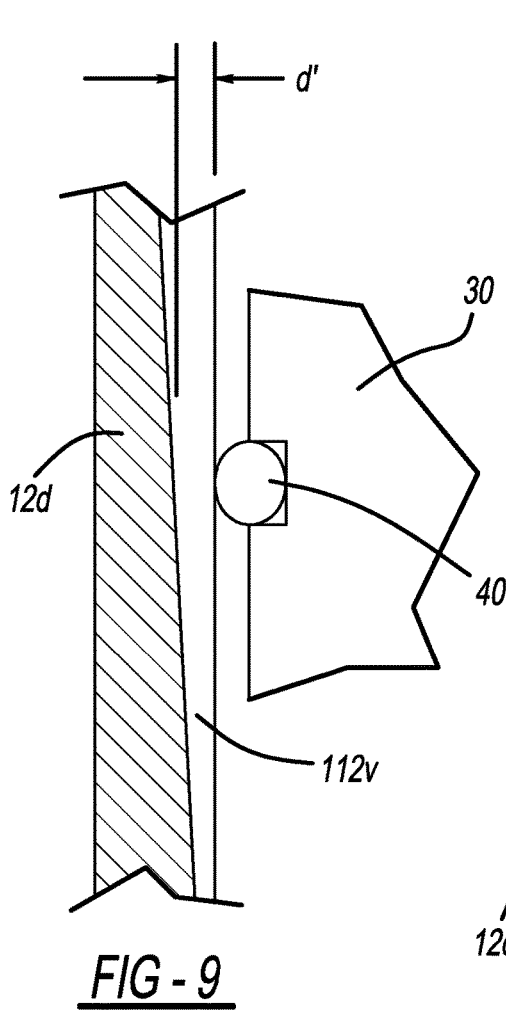
FIG. 9 is a cross-sectional view of a portion of a housing incorporating an embodiment of a vent groove having a varying cross-sectional area.

For example, in the embodiment shown in FIG. 9, the depth d' of groove 112v varies along at least a portion of the length of the groove. This variation in groove depth d' produces a corresponding variation in groove cross-sectional area along the length of the groove. In the particular embodiment shown in FIG. 9, the groove 112v is tapered so that the depth d' of the groove varies at a uniform rate along the length of the groove. Referring to FIG. 9A, in another particular embodiment, the width w of the vent groove varies along the length of the groove 12vv, thereby producing a corresponding variation in groove cross-sectional area along the length of the groove. In the particular embodiment of FIG. 9A, the groove width is tapered so as to vary at a uniform rate along the length of the groove. Alternatively, the cross-sectional area of the groove can be varied in any desired manner that can be fabricated.

In other embodiments, any groove may be formed into adjacent portions or sections comprising "zones" having different characteristics.

Figure 10:
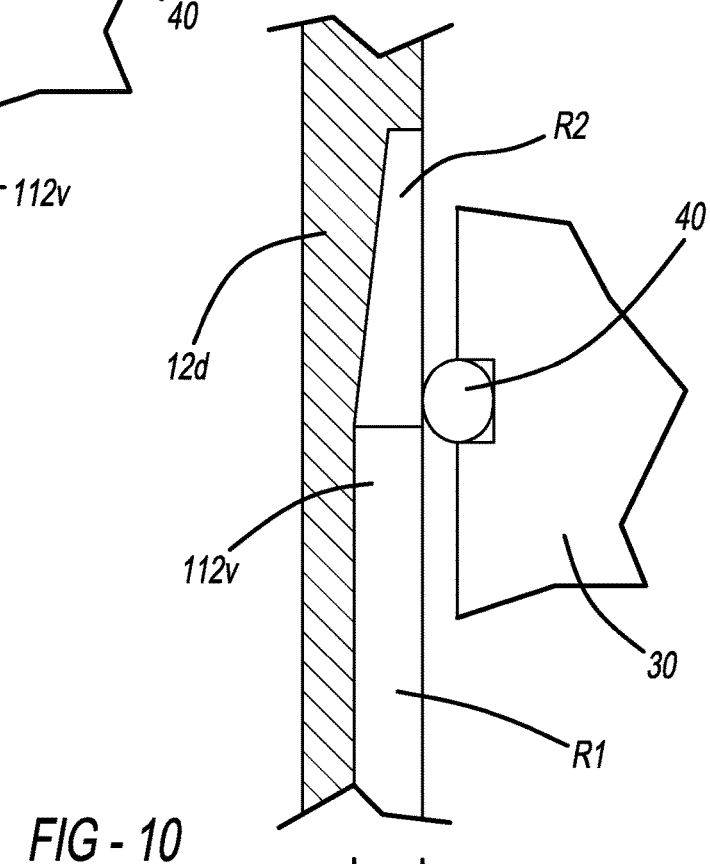
FIG. 10 is a cross-sectional view of a portion of a housing incorporating another embodiment of a vent groove having a varying cross-sectional area.
Figure 11:
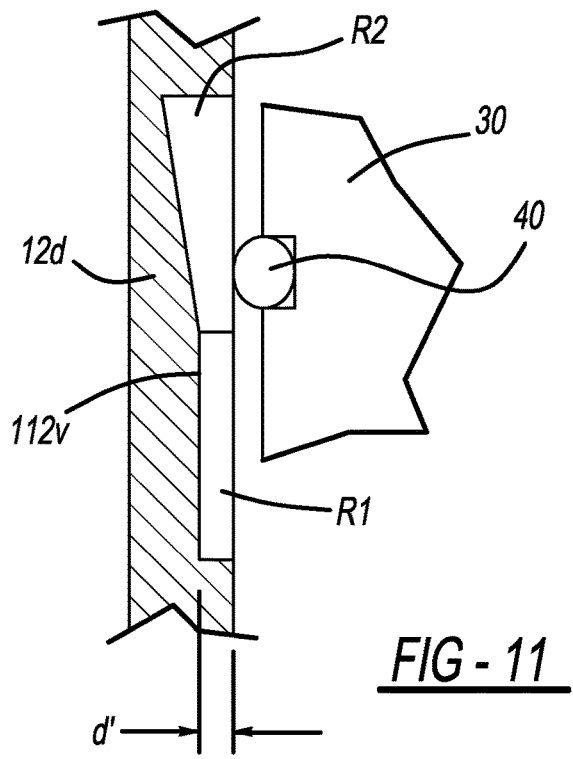
FIG. 11 is a cross-sectional view of a portion of a housing incorporating another embodiment of a vent groove having a varying cross-sectional area.

For example, in the embodiments shown in FIGS. 10 and 11, a first portion R1 of the groove 112v has a constant cross-sectional area, and a second portion R2 of the groove adjacent the first portion has a cross-sectional area which varies along the length of the groove second portion.

Figure 12:
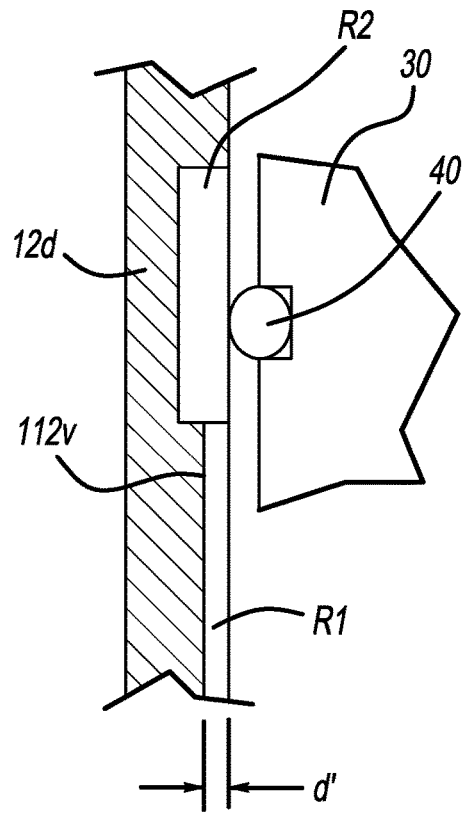
FIG. 12 is a cross-sectional view of a portion of a housing incorporating another embodiment of a vent groove having a varying cross-sectional area.

In the embodiment shown in FIG. 12, a first portion R1 of the groove 112v has a first constant cross-sectional area, and a second portion R2 of the groove adjacent the first portion has a second constant cross-sectional area different from the first cross-sectional area.

Figure 13:
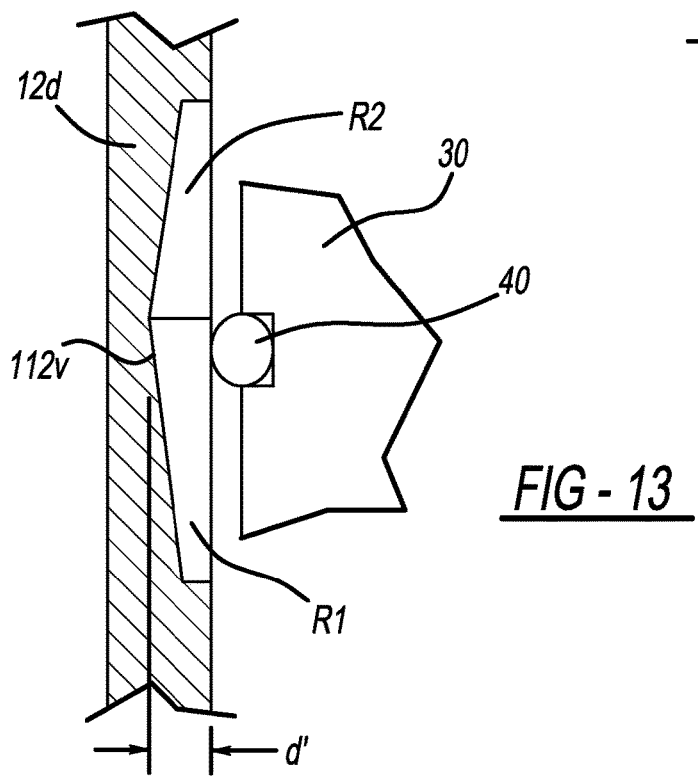
FIG. 13 is a cross-sectional view of a portion of a housing incorporating another embodiment of a vent groove having a varying cross-sectional area.

In the embodiment shown in FIG. 13, a first portion R1 of the groove 112v has a cross-sectional area which varies along the length of the groove, and a second portion R2 of the groove has a cross-sectional area which varies along the length of the groove.

In view of the above, it may be seen that numerous options exist for providing any of a wide variety of actuator force profiles, using the methods and structures described herein.

Referring to FIGS. 1-3, during operation of the actuator, the gas generator or other pressurized gas source is activated to introduce pressurized gas into the housing on the higher-pressure side P1 of the piston. The pressurized gas forces the piston in direction V, whereby a force is exerted by piston rod 50 on an element or mechanism attached thereto. The actuator force profile will be related to the amount of pressurized gas vented through the groove(s) from the higher pressure side P1 of the piston to the lower pressure side P2. At the end of the piston stroke and/or when the O-ring has passed the groove(s) and is in flush contact with ungrooved surfaces of the housing wall, the gasses remaining in the higher pressure side can continue to escape from the higher-pressure area to the lower pressure area between the housing wall and the O-ring (albeit much more slowly than if the gases flowed along one of the vent grooves) until the pressure in the higher-pressure area is nearly equalized with atmospheric pressure. The result is a fully depressurized actuator within seconds of actuator deployment.

Also, in a particular embodiment (not shown), prior to activation of the actuator, the piston 30 is positioned such that a portion of at least one vent groove resides on both the higher pressure side P1 (i.e., the gas generator side) and the lower pressure side (i.e., the side of the piston on which the piston rod 50 exits the housing 12) of the O-ring 40. This enables the housing internal pressures on sides P1 and P2 of the piston to be equalized during assembly of the actuator and prior to actuator activation.

Figure 14:
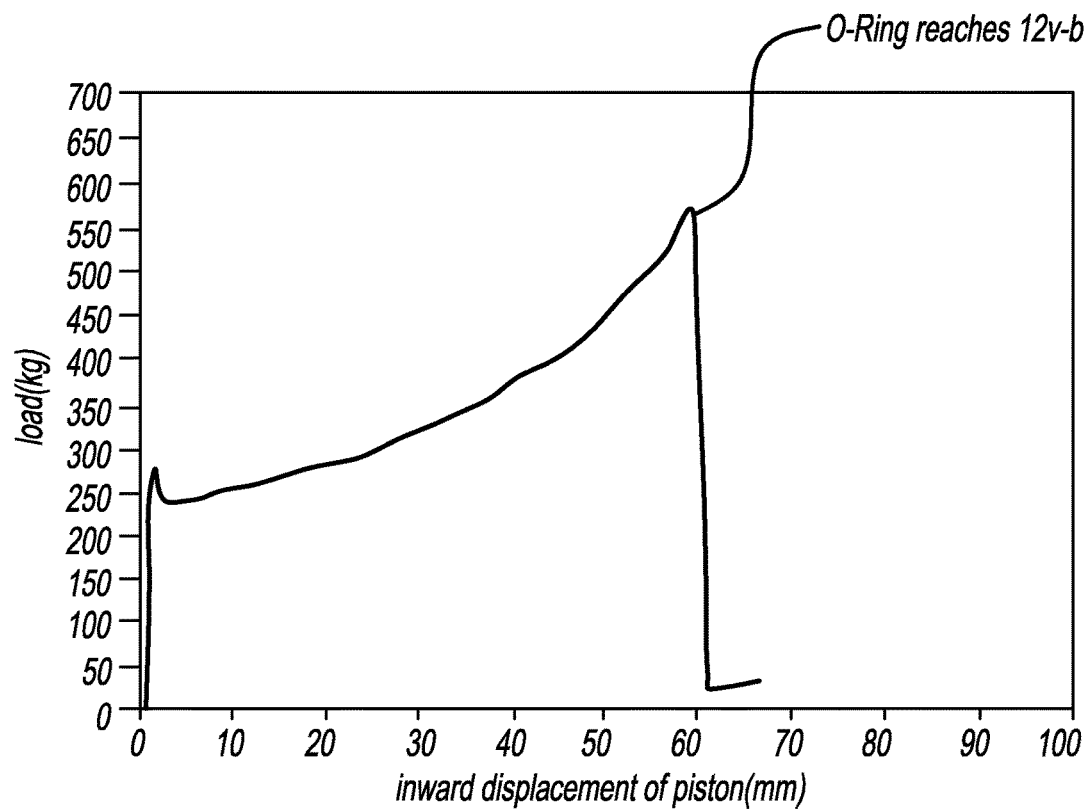
FIG. 14 shows a plot of force exerted by the piston rod vs. displacement of the piston in the negative Y direction for the actuator embodiment shown in FIGS. 1-3.
Figure 15:
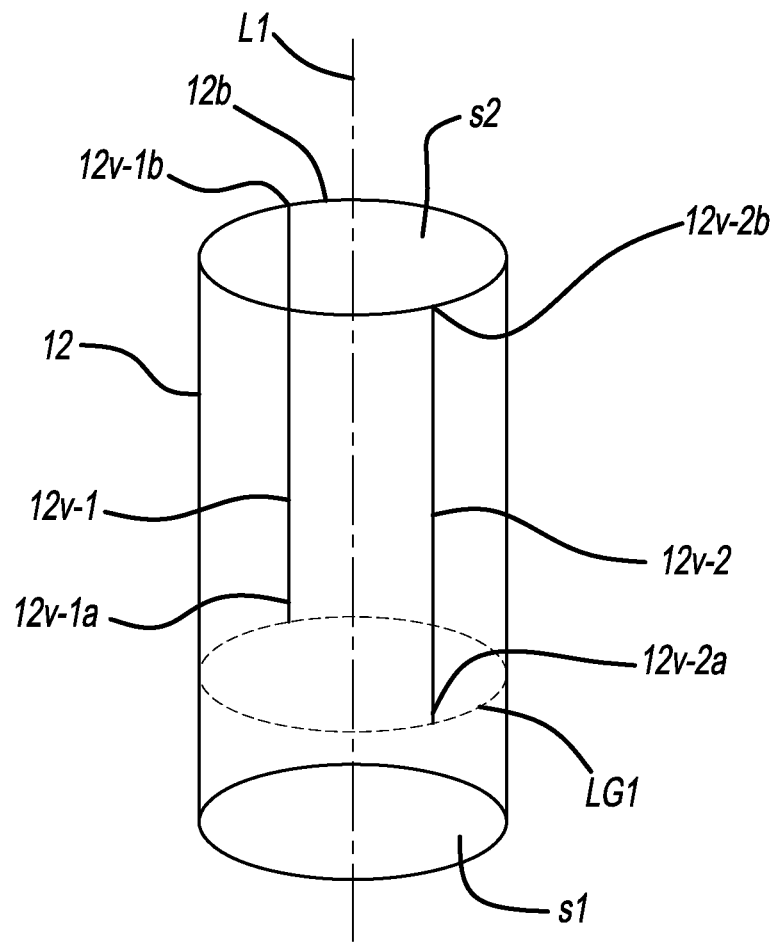
FIG. 15 is a schematic view of another actuator housing embodiment incorporating an alternative vent groove arrangement.

FIG. 14 shows a plot of force exerted by the piston rod vs. displacement of the piston in the negative V direction for the embodiment shown in FIGS. 1-3, after the actuator has been fully deployed (i.e., at maximum travel of the piston). As seen from FIG. 14, as the piston rod 50 is pressed back into the housing, the force resisting displacement of the piston 30 in the −V direction steadily increases until the O-ring reaches a point just past point 12v-b along the groove 12v. At this point, venting of the pressurized gas stored on side P1 of the piston is once again enabled. The gas vents through groove 12v, thereby causing the rapid drop in force resisting further movement of the piston in the −V direction shown in FIG. 3.

Referring to FIGS. 19A-21A, in another aspect of the embodiments described herein, an alternative piston rod configuration 150 may have a first end 150a, a second end 150b, and a wall 150w extending between the first and second ends to define an interior of the piston rod and a fluid flow passage extending between the ends. End 150a is open to receive therethrough a flow of pressurized gases from a gas source. These gases flow into the piston rod in the direction of arrows K to produce movement of the piston rod. Thus, in this embodiment, the separate piston 30 previously described is omitted from piston rod first end 150a. Rather, structure fulfilling the function of the piston (which may be similar to the separate piston 30 shown in FIGS. 1-3) is incorporated into first end 150a. First end 150a may include an o-ring or other resilient sealing means 40 positioned along an exterior surface thereof, as previously described.

A piston rod cap (generally designated 900 in FIGS. 19A-21A) is attached to piston rod second end 150b. Cap 900 is structured to be attached to (or to otherwise suitably engage) a mechanism to which the actuator force is to be imparted (for example, an underside of a vehicle hood). Thus, in this embodiment, the actuator force is transmitted from the piston rod 150 to the actuated mechanism via the piston rod cap 900.

In one embodiment, cap 900 has a base portion 900a structured for contacting or otherwise engaging the actuated mechanism, and a mounting portion 900b projecting from the base portion 900a. Mounting portion 900b is suitably secured in the hollow second end 150b of piston rod 150 (for example, by welding, a threaded connection or other means) so that the cap 900 will remain attached to the piston rod end 150b before, during and after activation of the actuator. Pressurized gases flowing into piston rod 150 press on cap 900 instead of on piston 30 as in previously described embodiments, to produce movement of the piston rod in the manner previously described.

In one embodiment, threads 900c (shown schematically in FIGS. 19B, 20B, 21 and 21A) are formed along exterior surfaces of the mounting portion, and are configured to engage complementary threads 150t (shown schematically in FIGS. 19B, 20B, 21 and 21A) formed along interior surfaces of the piston rod second end 150b. However, other attachment methods (for example, adhesives, welding, or any other suitable method) may be used.

In some applications of an actuator incorporating a piston rod 150 having a fluid flow passage extending therethrough and a cap 900 as just described, it is desirable to maintain the fluid pressure within the piston rod so that the piston rod 150 remains in the extended or deployed condition for a relatively extended period of time (for example, 15 minutes or more). In such embodiments, a sealing means may be provided to seal a contact interface between the cap 900 and piston rod 150, to aid in preventing or delaying a drop in pressure within the interior of piston rod 150 due to leakage of pressurized gases through the contact interface.

Referring to FIGS. 19A-19B, in one embodiment, cap 900 has an annular shoulder 900s formed along an exterior of the mounting portion 900b. A projection 900d extends from shoulder 900d and is dimensioned so as to provide a clearance 900e between the projection and an interior of the piston rod wall 150w opposite the projection.

A shoulder 150s is also formed along the interior of piston rod wall 150w. Shoulder 150s is positioned so as to reside opposite and spaced apart a distance d from piston shaft shoulder 900s when the cap 900 is attached to the piston rod in its final position (i.e., in the embodiments shown in FIGS. 19A-21A, the position in which cap base portion 900a contacts the end of the piston rod).

In this embodiment, the sealing means is in the form of a sealing member 910 (for example, an O-ring) positioned in the space d between shoulders 900s and 150s. The sealing member 910 may be seated along wall shoulder 150s prior to attachment of the cap to the end of piston rod 150. Alternatively, the sealing member 910 may be seated along mounting portion shoulder 900s prior to attachment of the cap 900 to the end of piston rod 150. When the cap 900 is threadedly or otherwise attached to the end of the piston rod, mounting portion shoulder 900s contacts sealing member 910 and presses the sealing member against wall shoulder 150s, thereby compressing the sealing member to form a compression seal between the opposed shoulders. This provides a substantially fluid-tight seal between the cap 900 and the piston rod 150 to aid in maintaining gas pressure within the piston rod during and after activation of the actuator.

Referring to FIGS. 20A-20B, in another particular embodiment, a suitable sealing material 920 is molded or otherwise applied to at least one of the piston rod inside wall 150w and the cap 900 (for example, along mounting portion shoulder 900s) prior to insertion of the cap mounting portion into the end of the piston rod and attachment of the cap 900 to the end of piston rod 150. When the cap is seated in its final position, the sealing material 920 is compressed as previously described to form the compression seal. In addition, the sealing material and the clearance 900e between the mounting portion projection 900d and wall 150w may be specified so as to permit sealing material to deform and flow between the projection 900d and the wall 150w when the sealing material is compressed between the opposed shoulders 900s and 150s. This increases the length of the seal, which, it is believed, increases the effectiveness of the seal. Some examples of suitable molding materials include rubber-based-materials and silicone based-materials. However, any other material suitable for the purposes described herein may be used.

Figure 21:
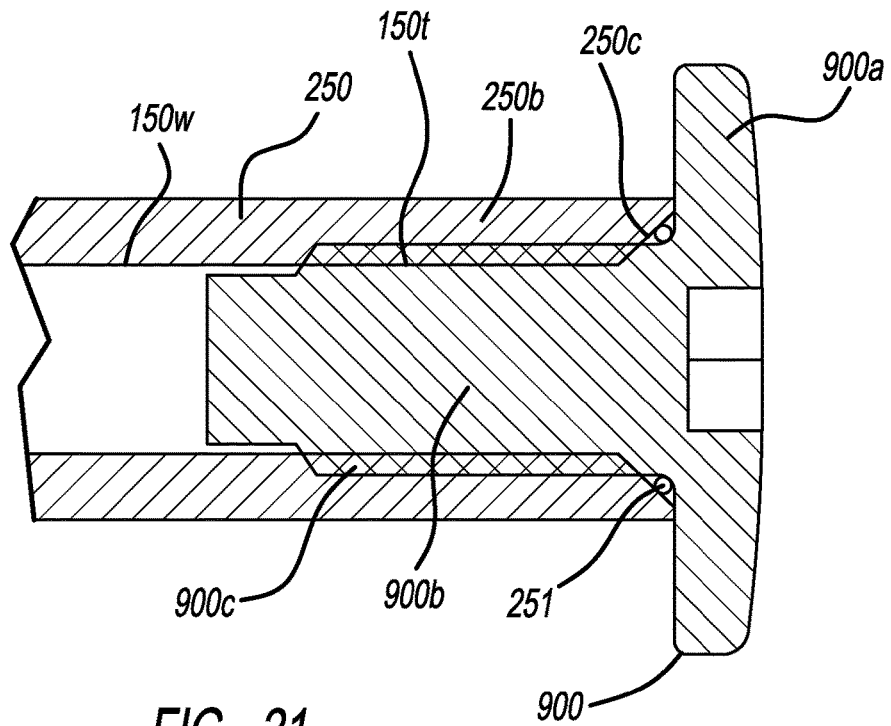
FIG. 21 is a magnified cross-sectional side view of a portion of another alternative embodiment of a sealed piston rod usable in embodiments described herein.

Referring to FIG. 21, in another particular embodiment, a mounting portion 900b of the cap 900 is attached to an end 250b of a piston rod 250 as previously described. A first end 250a (not shown) of the piston rod opposite second end 250b may be configured as end 150 shown previously, in FIG. 19A or 20A, for example. Rod 250 also has a semi-conical or chamfered surface 250c formed at or proximate the rod second end 250b, in the interior of the rod. A resilient seal 251 (for example, a suitable o-ring) is sized so as to be positionable along the chamfered surface 250c prior to attachment of the cap to the piston rod. During attachment of the cap to the piston rod, pressure is applied to the seal 251 to compress the seal between the chamfered surface 250c and the cap, thereby tightening the seal to aid in preventing leakage of pressurized gases from the piston rod interior.

Figure 21A:
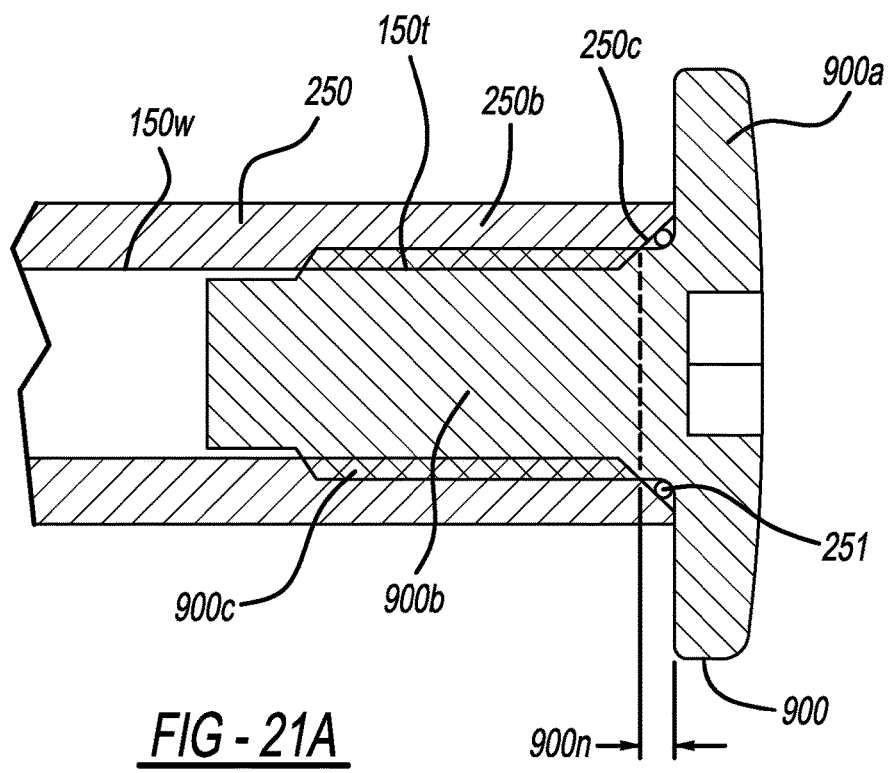
FIG. 21A is a magnified cross-sectional side view of a portion of another alternative embodiment of a sealed piston rod usable in embodiments described herein.

Referring to FIG. 21A, in an alternative embodiment, the seal 251 is positioned at the base of the mounting portion 900b prior to attachment of the piston rod cap 900 to the piston rod 150. The cap 900 may be affixed to the piston rod end 250b using complementary threads as previously described, or the cap 900 may be affixed using any other suitable method (for example, as adhesives, an interference fit, etc.). In the particular embodiment of the cap 900 shown in FIG. 21A, a non-threaded section 900n of the mounting portion 900b is provided at a junction between the base portion 900a and the mounting portion 900b for mounting and retention of the seal 251 prior to attachment of the cap 900 to the piston shaft. Screwing the cap 900 onto the piston rod end 250b then compresses the seal 251 as previously described.

Embodiments of the housing, piston, piston rod, cap and any other actuator elements described herein may be formed from any suitable material or materials, such as metals or metal alloys, for example.

It will be appreciated that a sealed piston rod in accordance with one of the embodiments just described may be employed in a housing which either does or does not incorporate venting grooves along the housing as previously described herein. Also, the sealing mechanisms described herein may be used for sealing the interior of the any hollow piston rod, to aid in preventing or slowing the escape of pressurized gases from the interior of the piston rod.

Figure 22:
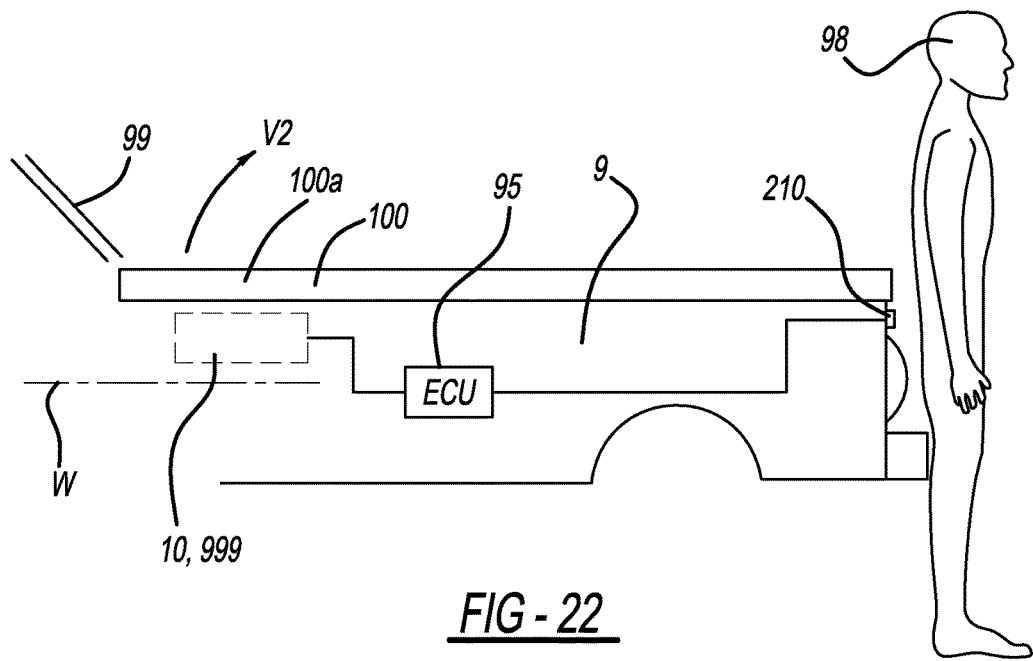
FIG. 22 is a schematic view of an actuator in accordance with an embodiment described herein incorporated into a hood lifting system or a pedestrian safety system in a vehicle, and prior to activation of the actuator.
Figure 23:
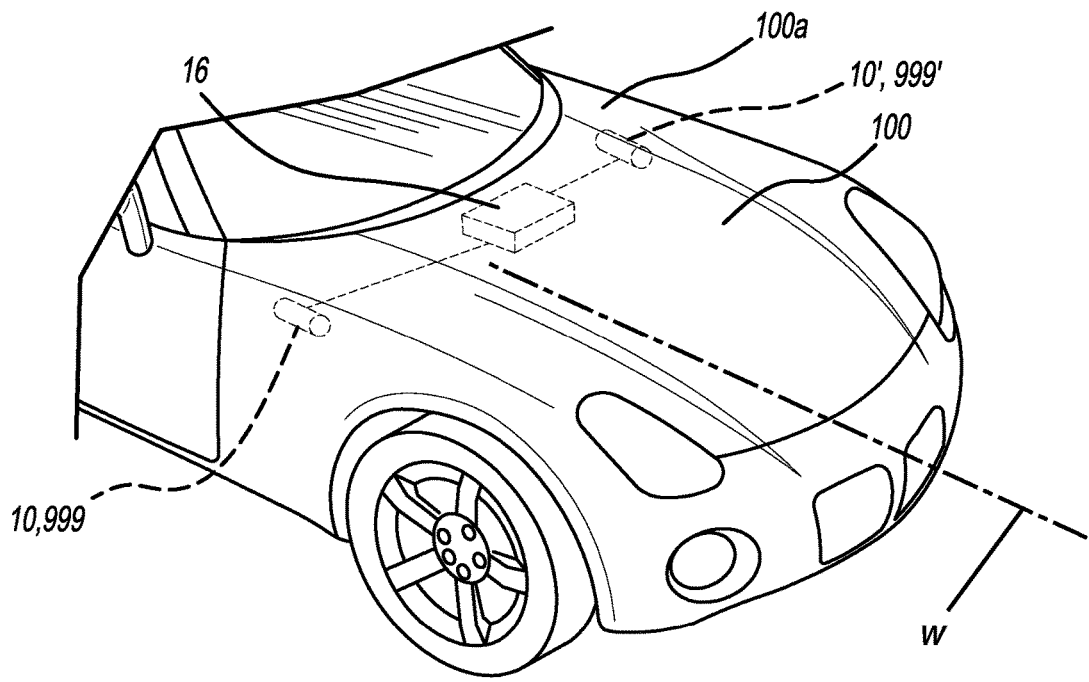
FIG. 23 is a perspective view of a portion of a vehicle incorporating a pedestrian safety system as shown in FIG. 5, with a pair of actuators positioned along an underside of the vehicle hood.

Referring now to FIGS. 22 and 23, in one example of an application of an actuator embodiment as described herein, the actuator 10 may be employed to lift a rear portion 100a of a vehicle hood 100, adjacent the windshield 99. In this application, a first end of the actuator housing (for example, first end 12a as previously shown in FIGS. 1-3, for example) is affixed to a portion of the vehicle 9, while an associated end of the piston rod (for example, an end 50b or 150b as previously shown in the drawings) extending from the actuator housing 12 is operatively coupled to a rear portion 100a of the vehicle hood (or is otherwise positioned with respect to the vehicle hood) such that activation of the actuator results in movement of the piston out of the actuator housing so as to lift the hood rear portion 100a in a known manner, either directly or indirectly. An embodiment of the actuator may be incorporated into a hood lifting mechanism or system including other components and designed to lift the rear portion of the hood responsive to predetermined activation criteria.

In one example, referring to FIG. 22, the actuator 10 is operatively coupled to a pressurized fluid source 999 which is operable to provide a pressurized fluid to the actuator upon receipt of the actuator activation signal. Fluid source 999 and/or actuator 10 may be in operable communication with a sensor 210 which is in communication with a processor or ECU 95 implementing a known algorithm that evaluates sensor inputs and initiates actuation of the actuator 10, based on predetermined activation criteria. Activation of the actuator 10 may be based on any desired criteria, for example, detected actual or imminent contact of the vehicle with a pedestrian 98, and/or any other desired criteria. In operation of the actuator 10, after activation, actuator piston rod 50, 150 deploys from housing 12, causing hood end 100a attached to piston rod 50, 150 to move upwardly in the direction indicated by arrow V2.

Referring to FIGS. 22 and 23, in a particular embodiment, a pair 10, 10' of actuators and associated pressurized fluid sources 999, 999' in accordance with embodiments described herein, may be spaced laterally apart from a fore-aft axis W of the vehicle on either side of the axis under the vehicle hood 100, and attached to portions of the vehicle proximate the rear of the hood. When activated, these actuators combine to lift spaced apart portions of the rear 100a of the hood 100, in a known manner. As known in the pertinent art, lifting the rear portion 100a of the hood 100 and maintaining the elevated hood portion in a position spaced apart from its normal resting position on the vehicle can aid in cushioning the impact of a pedestrian on this portion of the hood.

In other embodiments, an actuator as described herein and used as a hood lifter (or a hood lifting system incorporating such an actuator) may also be incorporated into a broader pedestrian safety system, which may incorporate additional elements (such as airbags, for example) (not shown) which are structured and positioned along the vehicle exterior and which are configured to be deployable to help cushion or otherwise protect a pedestrian coming into contact with the vehicle when the vehicle is moving.

Referring now to FIGS. 24A-26B, in other embodiments described herein, a pressurized fluid-powered actuator is provided which includes a housing having a wall defining a housing interior, at least one first vent formed into an interior surface of the wall so as to provide fluid communication along the wall between portions of the housing interior, and at least one opening enabling a flow of fluid therethrough, from the housing interior to an exterior of the housing. In addition, a meltable plug is positioned so as to prevent a flow of fluid through the at least one opening prior to melting of the plug. More particularly, an actuator is provided with a vent 710 which is positioned and configured to enable fluid communication between a first, relatively higher pressure side of a movable member positioned within the housing (for example, a piston such as piston 30 or piston rod 150 as previously described) and ambient atmosphere, or to enable fluid communication between a relatively higher pressure side of the movable member and a relatively lower pressure side of the movable member (where the relatively lower pressure side of the movable member is also in fluid communication with ambient atmosphere). The vent is sealed with a heat-sensitive material forming a heat-degradable plug or seal 760 which prevents a flow of pressurized gas through the vent when the plug is intact and in position.

The plug material is specified so as to ensure that the seal fails upon exposure to high temperatures, so as to permit a flow of pressurized gases through the vent. The plug material is specified so that this failure occurs within a range of temperatures lower than an auto-ignition temperature of any booster material or gas generant material incorporated into the gas generator, and higher than the highest temperature the actuator will encounter during installation and normal use. Such a plug failure temperature might be encountered, for example, during exposure of the actuator to an open flame or bonfire event. The plug 760 remains in position in vent 710 until exposure to the requisite high temperatures and resultant failure of the seal. Thus, in any embodiment, the vent provides an escape flow path for pressurized gases to atmosphere when the seal fails.

In a particular embodiment, the plug fails through a melting of the plug material at a temperature within the desired temperature range.

Plug 760 may be formed from any material suitable for a particular application. For example, metals, metals alloys, polymers, or other materials may be used.

In particular embodiments, plug 760 is formed from a material having a melt temperature above 135° C. and up to and including 250° C.

In certain embodiments, a known auto-ignition material formulated to ignite at a temperature below 200° C. is used in the pyrotechnic gas generator.

In more particular embodiments, such as embodiments incorporating an auto-ignition material, plug 760 is preferably formed from a material having a melt temperature within the range 135° C. to 150° C., inclusive.

In an embodiment of the actuator which does not incorporate an auto-ignition material, a plug material is preferably used having an exemplary range of melting temperature of 220-250° C., inclusive. One example of such a material is tin, with a melt temperature of about 232° C.

Examples of suitable polymers include high-density polyethylene (HDPE) with a melt temperature of 135° C.; grades of polypropylene having a melt temperature within the range 168-171° C., inclusive; and polyvinyl chloride (PVC).

In addition, in a manner known in the art, suitable fillers and modifiers may be added to a polymer to help stabilize the material until the desired melting point is reached.

The use of fillers to modify and control the properties of polymers is well-known in the pertinent art. U.S. Pat. No. 8,940,824, incorporated herein by reference in its entirety, is one example of a patent reference that discusses the use of fillers to modify and control the properties of polymers (for example, melting point). U.S. Pat. No. 8,815,357, incorporated herein by reference in its entirety, is one example of a patent reference that discusses the use of modifiers to control the properties of polymers.

Referring to FIG. 24A, in one embodiment 1000 of the actuator, a vent 710 and plug 760 as described above are incorporated into an alternative embodiment 130 of the piston 30 shown in FIG. 1, which acts to seal an end of the piston rod 50. Vent 710 enables fluid communication between the relatively higher pressure side of the piston urged upward by pressurized gas (i.e., the gas generator side of the piston) and a portion of an opposite side of the piston which resides between housing 12 and piston rod 50. Vent 710 is plugged with plug 760 formed from a heat-sensitive material as previously described.

Referring to FIG. 24B, after the plug reaches a temperature sufficiently high to melt the plug material or otherwise produce failure of the seal, gases then proceed from the higher pressure side of the piston through the vent 710 and to the atmosphere via housing opening 12f, along the paths indicated by arrows G.

Referring to FIG. 25A, in another embodiment, a vent 710 and plug 760 as described above are incorporated into another alternative embodiment 230 of the piston which has a hollow piston rod 610 attached thereto. This embodiment of the actuator is configured so that the vent 710 enables fluid communication between the relatively higher pressure side of the piston and the piston rod interior, which is in fluid communication with the atmosphere. Vent 710 is plugged with plug 760 formed from a heat-sensitive material as previously described.

Referring to FIG. 25B, after the plug reaches a temperature sufficiently high to melt the plug material or otherwise produce failure of the seal, gases then proceed from the higher pressure side of the piston through the vent and to the atmosphere via the interior of the piston rod 610 and through an opening formed in the piston rod cap, along the paths indicated by arrows G.

Referring to FIG. 26A, in another embodiment, a vent 710 and plug 760 as described above are incorporated into an alternative embodiment 112 of the actuator housing. This embodiment of the actuator is configured so that the vent 710 enables direct fluid communication between the relatively higher pressure side of the piston and the atmosphere, via a wall of housing 112. Vent 710 is plugged with plug 760 formed from a heat-sensitive material as previously described.

Referring to FIG. 26B, after the plug reaches a temperature sufficiently high to melt the plug material or otherwise produce failure of the seal, gases then proceed from the higher pressure side of the piston through the vent and to the atmosphere via the housing vent 710.

As well as the vent locations just described, the vent and associated plug could alternatively be positioned at any location suitable for providing a means of fluid communication between the relatively higher pressure side of the piston and ambient atmosphere.

It is seen that a vent and a heat sensitive seal in accordance with the embodiments described herein may be employed in any other gas-powered device where it is desired to enable fluid communication (via the vent) between a relatively higher pressure side of a piston (or other gas-movable member) and a relatively lower pressure side of the gas-movable member, and where it is desired to seal the vent with heat-sensitive plug or seal which prevents a flow of pressurized gas through the vent when the plug is intact and in position, and which melts or otherwise fails when exposed to a temperature within a predetermined range. For example, co-owned U.S. Pat. No. 6,568,184, herein incorporated by reference, describes yet another exemplary pyrotechnic actuator that could employ one or both of the novel venting and/or plug features of the present invention.

It will be understood that the foregoing descriptions of the various embodiments are for illustrative purposes. As such, the various structural and operational features herein disclosed are susceptible to a number of modifications, none of which departs from the scope of the appended claims.

What is claimed is:

1. A pressurized fluid-powered actuator comprising:
   a housing having a wall defining a housing interior and at least one first opening enabling venting of pressurized fluid from the housing interior to an exterior of the housing;
   a meltable plug structured and positioned so as to prevent venting of pressurized fluid through the at least first one opening prior to melting of the plug; and
   a movable member movably positioned within the housing, the movable member having at least one second opening formed therein and structured to enable fluid communication between a first side of the movable member and a second side of the movable member opposite the first side, wherein the second side is in fluid communication with the at least one first opening.

2. The actuator of claim 1 wherein the plug is positioned within the at least one first opening.

3. The actuator of claim 1 wherein the plug is positioned within the at least one second opening.

4. A hood lifting mechanism comprising an actuator in accordance with claim 1.

5. A pedestrian safety system comprising an actuator in accordance with claim 1.

6. A pressurized fluid-powered actuator comprising:
   a housing;
   a piston movably positioned within the housing;
   a hollow piston rod operatively coupled to the piston so as to move with the piston,
   the piston having at least one first opening formed therein, the at least one first opening being structured and positioned to enable fluid communication between a first side of the piston and an interior of the piston rod, the piston rod having at least one second opening structured to enable fluid communication between the piston rod interior and an exterior of the actuator; and
   a meltable plug positioned within the at least one first opening so as to prevent a flow of fluid through the at least one first opening prior to melting of the plug.

* * * * *